(12) United States Patent
Tsuchiya

(10) Patent No.: US 7,554,070 B2
(45) Date of Patent: Jun. 30, 2009

(54) IMAGING-CONTROL APPARATUS AND METHOD OF CONTROLLING SAME

(75) Inventor: Keiji Tsuchiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/168,359

(22) Filed: Jul. 7, 2008

(65) Prior Publication Data
US 2009/0014629 A1    Jan. 15, 2009

(30) Foreign Application Priority Data
Jul. 9, 2007    (JP) .............................. 2007-179980

(51) Int. Cl.
*H04N 5/00*    (2006.01)
(52) U.S. Cl. .............................. 250/208.1; 250/370.09; 378/98.8
(58) Field of Classification Search .............. 250/208.1, 250/370.08, 370.09; 378/98.8
See application file for complete search history.

(56) References Cited

U.S. PATENT DOCUMENTS

| | | | | |
|---|---|---|---|---|
| 5,463,668 | A * | 10/1995 | Kagaya | ...................... 378/98.2 |
| 6,823,044 | B2 * | 11/2004 | Rosner | ...................... 378/98.8 |
| 7,187,746 | B2 * | 3/2007 | Sakaguchi et al. | .............. 378/8 |
| 2005/0286679 | A1 * | 12/2005 | Sakaguchi et al. | .............. 378/8 |
| 2008/0226031 | A1 * | 9/2008 | Yokoyama et al. | ......... 378/98.7 |
| 2009/0014629 | A1 * | 1/2009 | Tsuchiya | ................. 250/208.1 |

FOREIGN PATENT DOCUMENTS

| | | |
|---|---|---|
| JP | 08-47491 A | 2/1996 |
| JP | 2000-70243 A | 3/2000 |
| JP | 2003-78124 A | 3/2003 |
| JP | 2003-244557 A | 8/2003 |

* cited by examiner

*Primary Examiner*—John R Lee
(74) *Attorney, Agent, or Firm*—Canon U.S.A., Inc., IP Division

(57) ABSTRACT

For performing imaging with a high-frame rate, a control apparatus determines the time where at least one electrical charge of a sensor is read based on information about the position of an irradiation area of the sensor, the irradiation area being irradiated with a radiation, so that the time period where at least one electrical charge of a non-irradiation area of the sensor is read, the non-irradiation area being irradiated with no radiation, overlaps the time period where irradiation with the radiation is performed and the time period where at least one electrical charge of the irradiation area of the sensor is read does not overlap the radiation-irradiation-time period.

10 Claims, 11 Drawing Sheets

IMAGING-CONTROL APPARATUS AND METHOD OF CONTROLLING SAME

BACKGROUND OF THE INVENTION

1. Field of the Invention

The present invention relates to an imaging-control apparatus controlling a sensor configured to detect an applied radiation as an electrical charge, a method of controlling the imaging-control apparatus, and a program provided to make a computer execute the control method.

2. Description of the Related Art

Imaging apparatuses are known that include amorphous silicon and/or polysilicon provided on a glass substrate as a film and that use a sensor including pixels arranged in a two-dimensional manner, where each of the pixels includes a photoelectric-conversion element and a thin-film transistor (TFT). Usually, the above-described image-capturing apparatuses perform matrix driving by using the TFTs, so as to read an electrical charge obtained through photoelectric conversion performed by each of the photoelectric-conversion elements.

Further, for example, X-ray-image-capturing apparatuses (radiography apparatuses) configured to capture the X-ray image of a subject by irradiating the subject with an X ray, which is one type of radiation, and detecting the X ray that passed the subject have been available, for example in the medical field. According to the X-ray-image-capturing apparatuses, the X ray that passed the subject is converted into visible light through a phosphor provided on each of the pixels of the sensor and the visible light is made incident on each of the pixels of the sensor (refer to Japanese Patent Laid-Open No. 2003-244557 and Japanese Patent Laid-Open No. 2003-78124, for example).

Japanese Patent Laid-Open No. 2003-244557 discloses a technology of performing a so-called offset correction when an X-ray image is captured by reading electrical charges of the photoelectric-conversion elements.

Japanese Patent Laid-Open No. 2003-78124 discloses an X-ray-image-capturing apparatus that can capture not only a still image but also video.

Hereinafter, reading of electrical charges of photoelectric-conversion elements of a sensor provided in an X-ray-image-capturing apparatus configured to capture video will be described.

FIG. 10 is a schematic plan view of a sensor 4 including pixels arranged in a two-dimensional manner, where each of the pixels includes a photoelectric-conversion element and a TFT. Further, FIG. 10 shows an upper-half area 4u and a lower-half area 41 of the sensor 4, and a position P11 of the upper end of the sensor 4, a position P12 of the center part of the sensor 4, and a position P13 of the lower end of the sensor 4.

The time period where electrical charges are read can be reduced by performing the electrical-charge reading in the upper-half area 4u and the lower-half area 41 of the sensor 4 at the same time. Here, each of arrows 101 and 102 indicates a direction in which the electrical charges are read in the above-described example. In that case, the electrical-charge reading is performed from the upper-end position P11 toward the center-position P12 and from the lower-end position P13 toward the center-position P12 at the same time.

FIG. 11, which shows a known example, is a timing chart showing example time where the X-ray irradiation is performed in video-capturing mode and example time where electrical charges are accumulated and/or read in and/or from the electric-conversion elements of the sensor in the video-capturing mode. According to the time shown in FIG. 11, each reading of electrical charges of the electric-conversion elements that had been irradiated with an X ray and reading of electrical charges of the electric-conversion elements irradiated with no X ray is performed a single time within the time period where the X-ray image corresponding to a single frame is captured (a frame time).

In FIG. 11, the X-ray-irradiation time is designated by reference characters Tx, the electrical-charge-reading time is designated by reference characters Tr, and a pixel value which is read when X-ray-irradiation is performed is designated by reference characters Vx, a pixel value read at the X-ray-non-irradiation time is designated by reference characters Vd, and the frame time corresponding to a single frame is designated by reference numeral Tf11, and the electrical-charge-accumulation time is designated by reference numeral Tw11.

Usually, so-called offset correction should be performed, so as to obtain an X-ray image. More specifically, the offset correction is performed by subtracting the pixel value Vd which is read when no X-ray irradiation is performed from the pixel value Vx read at the X-ray-irradiation time. Further, for thoroughly achieving the offset correction, the time period where electrical charges are accumulated while irradiation with the X ray is performed should be equivalent to the time period where electrical charges are accumulated when no X-ray irradiation is performed.

Since the X-ray irradiation should be performed while electrical charges are accumulated through the photoelectric-conversion elements, the electrical-charge reading is performed after the X-ray irradiation is finished. Further, the X-ray irradiation is performed after the electrical-charge reading performed without the X-ray irradiation is finished, where the electrical-charge reading is performed within the previous frame.

In that case, the time where electrical charges that had been irradiated with the X ray are read in the photoelectric-conversion elements provided at the upper-end position P11 and the lower-end position P13 of the sensor 4 shown in FIG. 10 corresponds to the first part of the time period where the electrical charges that had been irradiated with the X rays are read, as shown in FIG. 11. Further, the time where electrical charges that had been irradiated with the X rays are read in the photoelectric-conversion elements provided at the center position P12 of the sensor 4 corresponds to the last part of the time period where the electrical charges that had been irradiated with the X ray are read.

Incidentally, when a part-to-be-photographed of the subject is a part moving with speed, such as the heart, high-speed imaging with a small visual field is demanded. On the other hand, when the part-to-be-photographed of the subject is a part which hardly moves, such as the head, low-speed imaging with a large visual field is demanded. An X-ray-image-capturing apparatus achieved in consideration with the above-described demands is disclosed in Japanese Patent Laid-Open No. 08-47491, for example. More specifically, Japanese Patent Laid-Open No. 08-47491 disclosing the above-described X-ray-image-capturing apparatus further discloses a method of changing the read range of a sensor and driving an X-ray diaphragm according to the read range.

However, according to the X-ray-image-capturing apparatus shown in Japanese Patent Laid-Open No. 08-47491, the read range of the sensor should be controlled, so as to reduce the read range of the sensor for achieving the high-speed imaging with the small visual field, and to increase the read range of the sensor for achieving the low-speed imaging with the large visual field. Consequently, hardware relating to reading of the electrical charges of the sensor is complicated.

SUMMARY OF THE INVENTION

Accordingly, the present invention allows for capturing video with a small visual field and a high-frame rate by using a simple configuration without complicating the configuration of an apparatus.

Therefore, according to an embodiment of the present invention, a control apparatus for controlling a sensor which detects radiation from a radiation-generation device and generates an electrical charge based on the detected radiation is provided, where the control apparatus includes a determination unit configured to determine a time when at least one electrical charge of the sensor is read based on information about the position of an irradiation area of the sensor, the irradiation area being an area of the sensor irradiated with the radiation, so that a time period during which at least one electrical charge of a non-irradiation area of the sensor is read, the non-irradiation area being an area of the sensor not being irradiated with radiation, overlaps an irradiation time period during which irradiation of the irradiation area with the radiation is performed, and so that a time period where at least one electrical charge of the irradiation area of the sensor is read does not overlap the irradiation-time period, and a control unit configured to control reading of the electrical charge of the sensor based on the time at which the electrical charge of the sensor is read, the time being determined by the determination unit.

Further, according to another embodiment of the present invention, a control method for controlling a sensor which detects radiation from a radiation-generation unit and generates an electrical charge based on the detected radiation is provided, where the control method includes determining a time when at least one electrical charge of the sensor is read based on information about the position of an irradiation area of the sensor, the irradiation area being an area of the sensor irradiated with the radiation, so that a time period during which at least one electrical charge of a non-irradiation area of the sensor is read, the non-irradiation area being an area of the sensor not being irradiated with radiation, overlaps an irradiation time period during which irradiation of the irradiation area with the radiation is performed, and so that a time period where at least one electrical charge of the irradiation area of the sensor is read does not overlap the irradiation-time period, and controlling reading of the electrical charge of the sensor based on the time at which the electrical charge of the sensor is read, the time being determined at the determination step.

Further, according to another embodiment of the present invention, a computer-readable storage medium storing a program making a computer execute a control method for controlling a sensor which detects radiation from a radiation-generation unit and generates an electrical charge based on the detected radiation is provided, where the control method includes determining a time when at least one electrical charge of the sensor is read based on information about the position of an irradiation area of the sensor, the irradiation area being an area of the sensor irradiated with the radiation, so that a time period during which at least one electrical charge of a non-irradiation area of the sensor is read, the non-irradiation area being an area of the sensor not being irradiated with radiation, overlaps a time period during which irradiation of the irradiated area with the radiation is performed, and a time period where at least one electrical charge of the irradiation area of the sensor is read does not overlap the irradiation-time period, and controlling reading of the electrical charge of the sensor based on the time at which the electrical charge of the sensor is read, the time being determined at the determination step.

Further features of the present invention will become apparent from the following description of exemplary embodiments with reference to the attached drawings.

DESCRIPTION OF THE EMBODIMENTS

Imaging-control apparatuses according to embodiments of the present invention will now be described. In the following embodiments, X-ray-image-capturing apparatuses using X rays as a radiation will be described. However, the present invention can be achieved without being limited to the above-described embodiments. A radiation which can be used for the present invention may include not only the X ray, but also an α ray, a β ray, a γ ray, etc. An apparatus configured to process a radiation image captured by using the above-described radiations may constitute another embodiment of the present invention.

First Embodiment

A first embodiment of the present invention will now be described with reference to the attached drawings.

Figure 1:
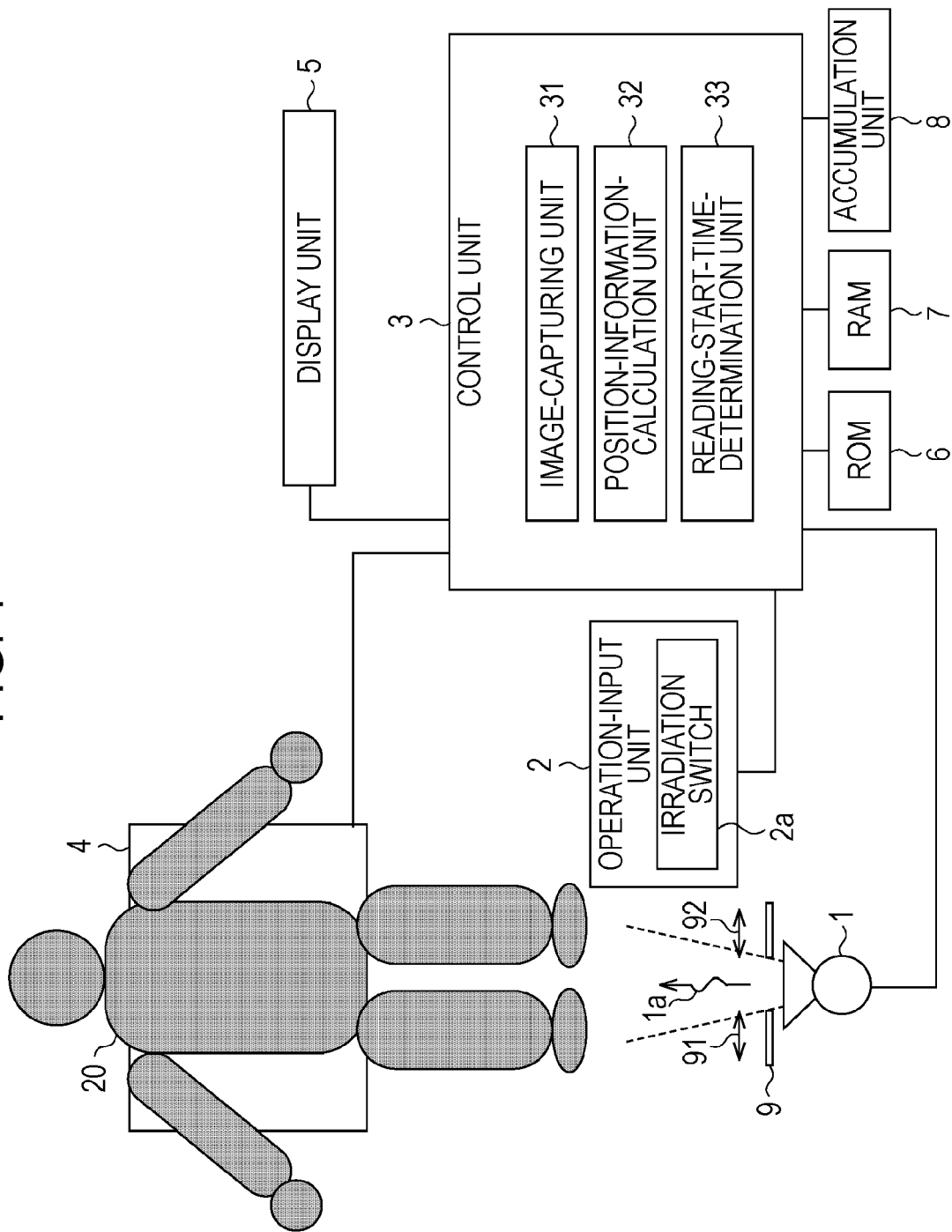
FIG. 1 is a block diagram showing a schematic configuration of an X-ray-image-capturing apparatus according to a first embodiment of the present invention.

FIG. 1 is a block diagram showing a schematic configuration of an X-ray-image-capturing apparatus (imaging-control apparatus) 10 according to the first embodiment. As shown in FIG. 1, the X-ray-image-capturing apparatus 10 includes an X-ray-generation unit 1, an operation-input unit 2, a control unit 3, a sensor 4, a display unit 5, a read-only memory (ROM) 6, a random-access memory (RAM) 7, an accumulation unit 8, and an X-ray diaphragm 9. Further, the control unit 3 includes an image-capturing unit 31, a position-information-calculation unit 32, and a reading-start-time-determination unit 33, as functional units.

The X-ray-generation unit (a radiation-generation unit) 1 can sequentially generate X rays 1a in pulse-like manner for a subject (an examinee) 20. The X-ray-generation unit 1 includes, for example, an X-ray tube.

The operation-input unit 2 is operated by a user, so as to input information about an instruction to the X-ray-image-capturing apparatus 10. The operation-input unit 2 includes an irradiation switch 2a operated by the user, so as to make the X-ray-generation unit 1 generate the X ray 1a.

For example, the control unit 3 reads a program or the like stored in the ROM 6, and controls the entire X-ray-image-capturing apparatus 10 based on the above-described program or the like. Particularly, in the first embodiment, the control unit 3 achieves processing procedures that will be described later with reference to FIGS. 4 and 8, and/or processing procedures performed in each of the functional units 31 to 33 based on the program or the like stored in the ROM 6.

Here, the image-capturing unit 31 controls X-ray irradiation performed by the X-ray-generation unit 1, which is a radiation-generation unit, while electrical charges are accumulated in the sensor 4. Further, the image-capturing unit 31 controls reading of electrical charges stored in the sensor 4 so that an X-ray image is captured. Further, the image-capturing unit 31 controls the accumulation of electrical charges in the sensor 4 when no irradiation with the X ray applied from the X-ray-generation unit 1 is performed. After that, the image-capturing unit 31 controls reading of the electrical charges stored in the sensor 4 so that a dark image is captured.

The position-information-calculation unit 32 acquires position information (irradiation-area-position information) relating to the position of an area irradiated with the X ray 1a restricted by the X-ray diaphragm 9, which is an irradiation-area-restriction unit, where the position is specified on the sensor 4. The reading-start-time-determination unit 33 determines the time where the reading of the electrical charges stored in the sensor 4 is started based on the position information (the irradiation-area-position information) calculated by the position-information-calculation unit 32. The above-described reading-start time is determined with reference to the time where irradiation with the X ray 1a applied from the X-ray-generation unit 1 is performed. More specifically, the reading-start-time-determination unit 33 determines the time where reading of electrical charges provided on a non-irradiation area other than the irradiation area of the sensor 4 is started so that the determined time falls within a time period where the irradiation with the X ray 1a generated by the X-ray-generation unit 1 is performed.

The sensor 4 detects the X ray 1a that is emitted from the X-ray-generation unit 1, is allowed to pass through the subject 20, and is incident on the sensor 4, as an electric signal (electrical charge), under the control of the control unit 3 (the image-capturing unit 31). Further, the sensor 4 detects an electric signal (electrical charge) when no irradiation with the X ray 1a applied from the X-ray-generation unit 1 is performed, that is to say, in a dark state under the control of the control unit 3 (the image-capturing unit 31).

The sensor 4 includes, for example, pixels arranged in a two-dimensional manner, where each of the pixels includes a photoelectric-conversion element and a thin-film transistor (TFT). In that case, a phosphor is provided, for example, on each of the above-described pixels. Further, the X ray 1a which is incident on the sensor 4 is converted into visible light through the phosphors. The visible light is made incident on the photoelectric-conversion element of each of the pixels, and the electrical charge corresponding to the visible light is generated in each of the photoelectric-conversion elements. In the first embodiment, the above-described phosphor and the above-described photoelectric-conversion element generate a conversion element converting an incident X ray into an electrical charge. However, a so-called direct-conversion element that includes no phosphor, for example, and that directly converts the incident X ray into an electrical charge may be provided. In the following description, therefore, the sensor 4 includes the "conversion elements" arranged in the two-dimensional manner.

Further, as described in BACKGROUND OF THE INVENTION, the sensor 4 performs accumulation and reading of electrical charges of the conversion element alternately and repeatedly, so as to capture an X-ray image and a dark image.

The display unit 5 is a display unit configured to display an X-ray image (a radiation image) on which data is read from the sensor 4, an operation user interface (UI), etc. under the control of the control unit 3.

The ROM 6 stores a program or the like that is necessary for the control unit 3 configured to perform the processing procedures shown in FIGS. 4 and 8 that will be described later, and that is necessary to perform other processing procedures performed to control the X-ray-image-capturing apparatus 10.

For example, the RAM 7 is used when the control unit 3 performs various control procedures and is configured to store data temporarily.

For example, the accumulation unit 8 temporarily accumulates and stores data on X-ray images (radiation images) generated on the sensor 4.

The X-ray diaphragm 9 is the irradiation-area-restriction unit configured to restrict the irradiation area irradiated with the X ray 1a that is applied from the X-ray-generation unit 1 and that is made incident on the sensor 4 under the control of the control unit 3. The X-ray diaphragm 9 restricts (limits) an area where the X-ray image of the subject 20 is captured.

In FIG. 1, the control unit 3 moves the X-ray diaphragm 9 in directions specified by arrows 91 and 92 that are shown in FIG. 1 by using a moving unit (not shown), for example, so as to restrict the irradiation area irradiated with the X ray 1a. Further, when the irradiation switch 2a is operated and turned on, the control unit 3 performs control so that the X-ray-generation unit 1 applies the X rays 1a in a pulse-like manner. Further, the control unit 3 reads an electrical charge generated based on the X ray 1a that passed through the subject (examinee) 20 from the sensor 4 in synchronization with a pulse signal of the X ray 1a so that an X-ray image is generated, and performs image processing including offset-correction processing. After that, the control unit 3 displays the X-ray image on the display unit 5. Further, for an image generated based on electrical charges existing on the non-irradiation area of the sensor 4, where the non-irradiation area is not irradiated with the X ray 1a due to the X-ray diaphragm 9, the control unit 3 sets the values of pixels of the above-described image to predetermined values. That is to say, the control unit 3 can perform masking, so as to set the pixel values to the predetermined values.

Processing procedures performed by the position-information-calculation unit 32 and the reading-start-time-determination unit 33 will be described in detail, as below.

Figure 2:
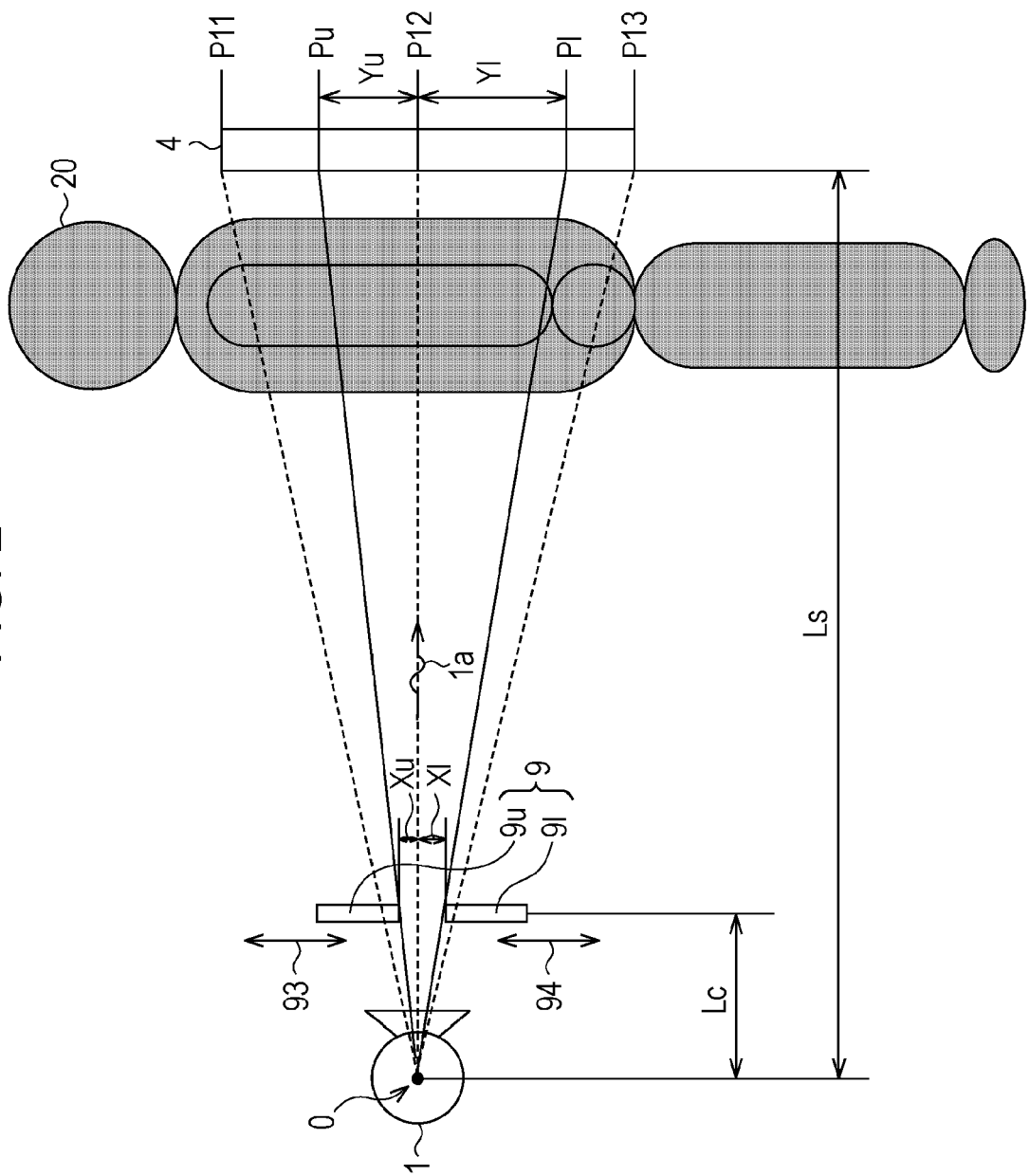
FIG. 2 is a schematic diagram illustrating processing procedures performed by a position-information-calculation unit of the X-ray-image-capturing apparatus according to the first embodiment.

FIG. 2 is a schematic diagram describing the processing procedures performed by the position-information-calculation unit 32 of the X-ray-image-capturing apparatus 10 according to the first embodiment of the present invention. In FIG. 2, the same components as those shown in FIG. 1 are designated by the same reference numerals.

FIG. 2 shows the X-ray-generation unit 1, the X-ray diaphragm 9, the subject (examinee) 20, and the sensor 4. FIG. 2 further shows a position P11 indicating the position of the upper end of the sensor 4, a position P12 indicating the position of the center part of the sensor 4, and a position P13 indicating the lower end of the sensor 4. Here, a height of the focus point O of the X-ray-generation unit 1 is defined at the same height as that where the center position P12 is defined.

Here, a distance defined from the center position P12 in the direction of the height of the upper part of the X-ray diaphragm 9 (the vertical direction), the upper part being determined to be an upper X-ray diaphragm 9u, is designated by reference characters Xu. Further, a distance defined from the center position P12 in the direction of the height of the lower part of the X-ray diaphragm 9 (the vertical direction), the lower part being determined to be a lower X-ray diaphragm 91, is designated by reference characters Xl. Further, the position of the upper end of the irradiation area irradiated with X ray 1a, the upper-end position being defined on the sensor 4, is determined to be an irradiation-area-upper-end position Pu, and the position of the lower end of the irradiation area irradiated with X ray 1a, the lower-end position being defined on the sensor 4, is determined to be an irradiation-area-lower-end position Pl. Further, the distance between the center position P12 of the sensor 4 and an irradiation-area-upper-end position Pu, which is the position of the upper end of the area irradiated with the X ray 1a, is determined to be a distance Yu, and the distance between the center position P12 of the sensor 4 and an irradiation-area-lower-end position Pl, which is the position of the lower end of the area irradiated with the X ray 1a, is determined to be a distance Yl. Further, a distance defined from the focus position O of the X-ray-generation unit 1 to the X-ray diaphragm 9 in the horizontal direction (lateral direction) is determined to be a distance Lc, and a distance defined from the focus position O to the sensor 4 in the horizontal direction (lateral direction) is determined to be a distance Ls. In the first embodiment, the distances Xu and Xl relating to the position of the opening of the X-ray diaphragm 9, and the distance Lc relating to the position of the X-ray diaphragm 9, the distance Lc being determined with reference to the focus position O of the X-ray-generation unit 1, are referred to as diaphragm-position information.

Then, the control unit 3 can move the X-ray diaphragm 9u in a direction indicated by an arrow 93 shown in FIG. 2 and the X-ray diaphragm 91 in a direction indicated by an arrow 94 shown in FIG. 2 by using the above-described moving unit (not shown), for example. Further, the control unit 3 can detect the moving amount (the distance Xu) of the X-ray diaphragm 9u and the moving amount (the distance Xl) of the X-ray diaphragm 91.

The position-information-calculation unit 32 calculates the distances Yu and Yl, as the irradiation-area-position information relating to the position of the area irradiated with the X ray 1a restricted by the X-ray diaphragm 9, the position being defined on the sensor 4 (the irradiation-area-upper-end position Pu and the irradiation-area-lower-end position Pl). More specifically, the position-information-calculation unit 32 calculates the distance Yu between the center position P12 of the sensor 4 and the irradiation-area-upper-end position Pu according to Equation (1) and the distance Yl between the center position P12 and the irradiation-area-lower-end position Pl according to Equation (2), as below.

$$Yu = Xu \cdot Ls/Lc \qquad \text{Equation (1)}$$

$$Yl = Xl \cdot Ls/Lc \qquad \text{Equation (2)}$$

That is to say, the position-information-calculation unit 32 calculates the distances Yu and Yl, which are included in the irradiation-area-position information, based on the diaphragm-position information (the distances Xu and Xl, and the distance Lc) and the distance Lc relating to the position of the sensor 4, the distance Lc being determined with reference to the focus position O of the X-ray-generation unit 1. Thus, information about the position of the irradiation area defined on the sensor 4 is acquired.

Usually, it is considered that the distance Lc is constant and the distance Ls varies. Therefore, the control unit 3 measures the distance Ls between the focus position O of the X-ray-generation unit 1 and the sensor 4 by using a measuring unit (not shown), for example. A method of measuring a distance by using ultrasound can be used as an example among various methods of achieving the above-described measurement by using the measuring unit (not shown). Here, in the first embodiment, the position-information-calculation unit 32 calculates the distances Yu and Yl based on the distance Ls measured by the measuring unit (not shown). However, the distances Yu and Yl may be calculated based on the distance Ls on which data is transmitted from the user via the operation-input unit 2, for example.

Figure 3:
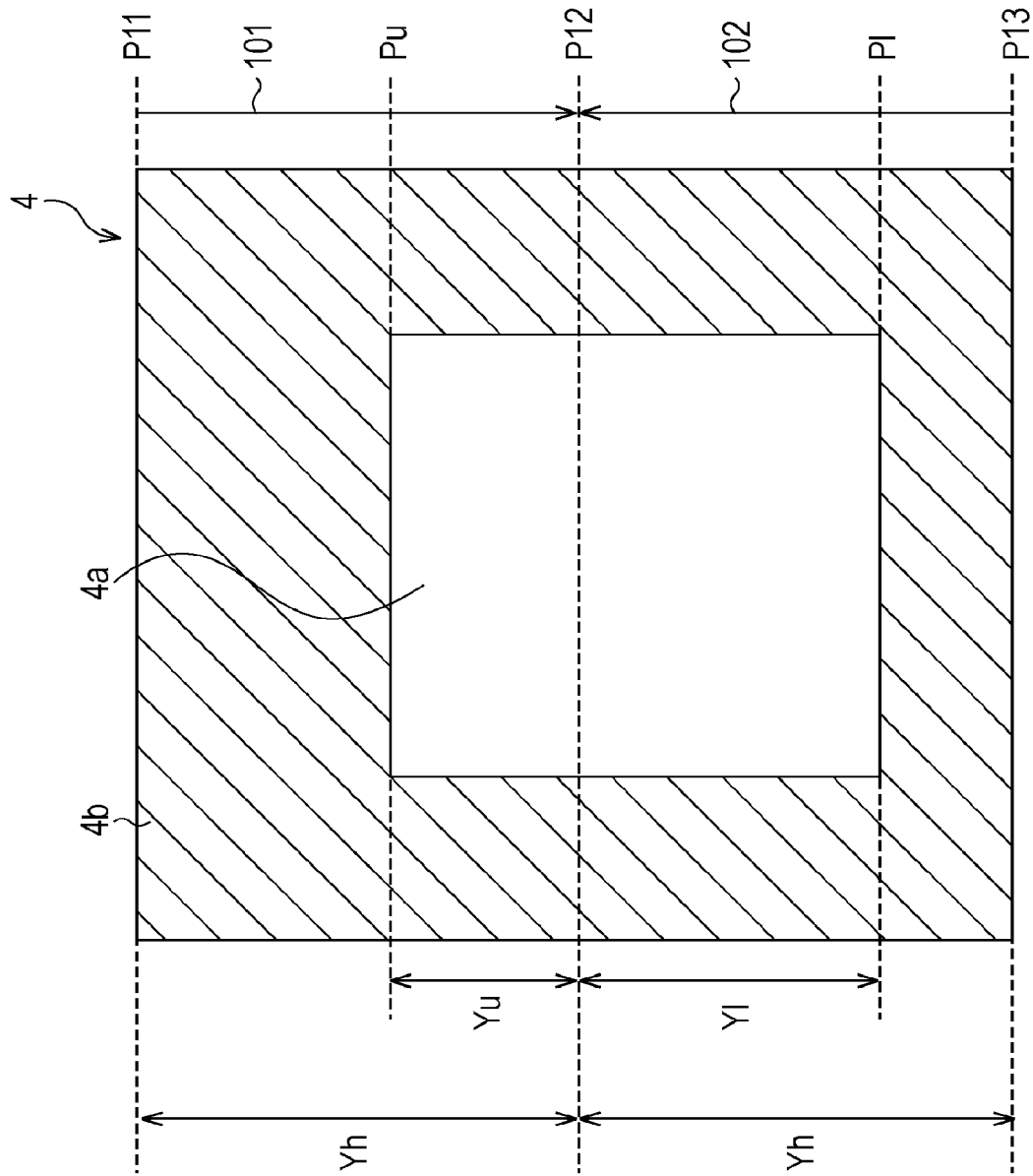
FIG. 3 is a schematic plan view of a sensor of the X-ray-image-capturing apparatus according to the first embodiment.
Figure 10:
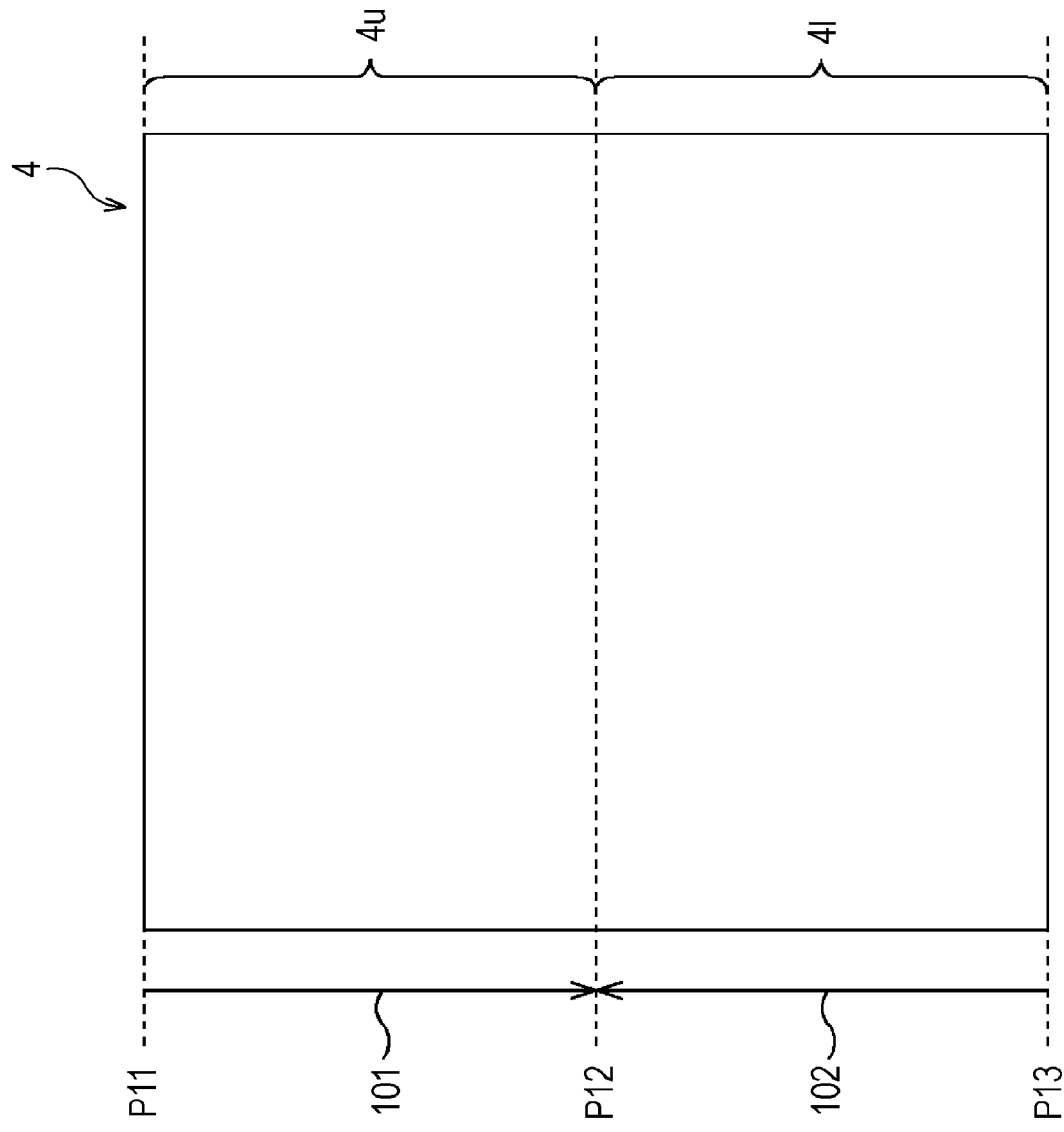
FIG. 10 is a schematic plan view of a sensor.

FIG. 3 is a schematic plan view of the sensor 4 of the X-ray-image-capturing apparatus 10 according to the first embodiment of the present invention. In FIG. 3, the same components as those shown in FIGS. 2 and 10 are designated by the same reference numerals.

FIG. 3 shows the upper-end position P11, the center position P12, and the lower-end position P13 of the sensor 4, as the position of the sensor 4, and the irradiation-area-upper-end position Pu and the irradiation-area-lower-end position Pl. Further, an arrow 101 shown in FIG. 3 indicates the order in which electrical charges existing on the area corresponding to the upper half of the sensor 4 are read, and an arrow 102 shown in FIG. 3 indicates the order in which electrical charges existing on the area corresponding to the lower half of the sensor 4 are read, as is the case with FIG. 10. The sensor 4 described in the first embodiment reads electrical charges existing on a line defined along the upper end P11 and those existing on a line defined along the lower end P13 at one time, and reads electrical charges existing on two lines at one time in the orders indicated by the arrows 101 and 102. Further, as is the case with FIG. 2, the distance between the center position P12 of the sensor 4 and the irradiation-area-upper-end position Pu is determined to be the distance Yu, and the distance between the center position P12 and the irradiation-area-lower-end position Pl is determined to be the distance Yl.

According to the sensor 4 shown in FIG. 3, the distance between the upper-end position P11 and the center position P12 of the sensor 4 is equivalent to that between the lower-end position P13 and the center position P12 of the sensor 4, and is determined to be a distance Yh. Further, a hatched area 4b of the sensor 4 is a non-irradiation area, which is not irradiated with the X ray 1a due to the X-ray diaphragm 9, and a blank area 4a of the sensor 4 is the irradiation area, which is irradiated with the X ray 1a. Namely, the non-irradiation area 4b is an imaging area of the sensor 4 with the exception of the irradiation area 4a.

First, the reading-start-time-determination unit 33 calculates a time period Tu where electrical charges are read from the upper-end position P11 of the sensor 4 to the irradiation-area-upper-end position Pu, and a time period Tl where electrical charges are read from the lower-end position P13 of the sensor 4 to the irradiation-area-lower-end position Pl.

More specifically, the reading-start-time-determination unit 33 calculates the electrical-charge-reading time Tu according to Equation (3) shown below and the electrical-charge-reading time Tl according to Equation (4) shown below. At that time, an electrical-charge-reading time where the electrical-charge reading is performed from the conversion elements of the pixels provided at the upper-end position P11 in the direction indicated by the arrow 101 and the electrical-charge reading is performed from the conversion elements of the pixels provided at the lower-end position P13 in the direction indicated by the arrow 102 at one time is determined to be an electrical-charge-reading time Tr. Namely, the above-described electrical-charge-reading time Tr is a time period where the electrical charges of all of the conversion elements of the sensor 4 are read. Here, the speed with which the above-described electrical charges are read is constant.

$$Tu = Tr \cdot (Yh - Yu)/Yh \quad \text{Equation (3)}$$

$$Tl = Tr \cdot (Yh - Yl)/Yh \quad \text{Equation (4)}$$

Next, the reading-start-time-determination unit 33 compares the electrical-charge-reading time Tu to the electrical-charge-reading time Tl and determines the electrical-charge-reading time shorter than the other to be the minimum time. In FIG. 3, the electrical-charge-reading time Tl is shorter than the electrical-charge-reading time Tu. Therefore, the reading-start-time-determination unit 33 determines the electrical-charge-reading time Tl to be the minimum time.

After that, the reading-start-time-determination unit 33 compares an X-ray-irradiation time Tx to the minimum time Tl and determines the time shorter than the other to be a selection time. Usually, the X-ray-irradiation time Tx is on the order of from several milliseconds to a little over ten milliseconds, and the electrical-charge-reading time Tr is on the order of from ten milliseconds to several tens of milliseconds.

Next, processing procedures performed by the X-ray-image-capturing apparatus (imaging-control apparatus) 10 according to the first embodiment will be described with reference to a flowchart of FIG. 4.

Figure 4:
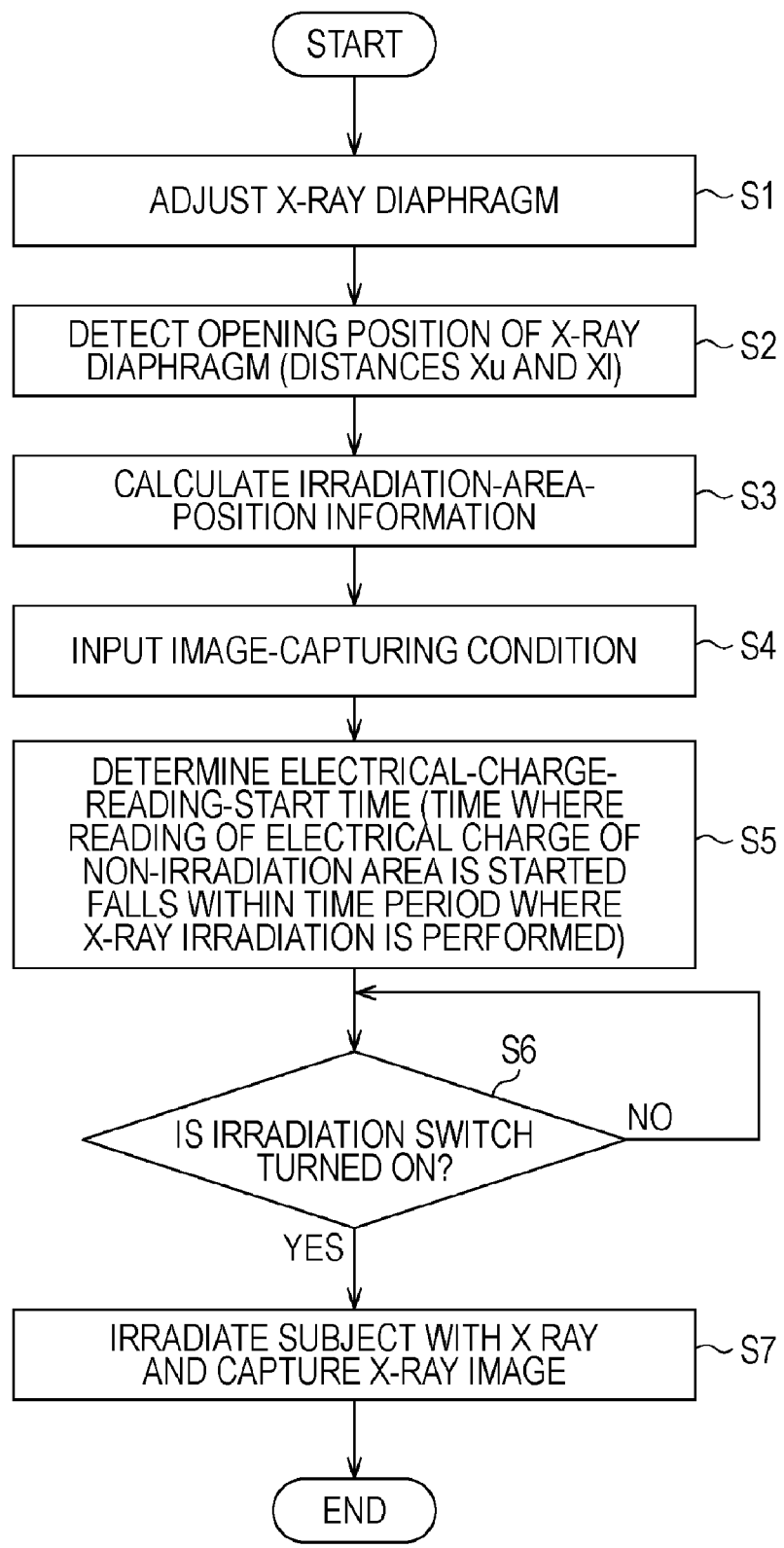
FIG. 4 is a flowchart showing example processing procedures performed by the X-ray-image-capturing apparatus (imaging-control apparatus) according to the first embodiment.

First, the control unit 3 makes input settings of the distances Ls, Lc, and Yh on which data is transmitted from the user via the operation-input unit 2, at step S1 shown in FIG. 4. Next, upon receiving information about adjustment of the X-ray diaphragm 9 via the operation-input unit 2, for example, the information being transmitted from the user, the control unit 3 adjusts the X-ray diaphragm 9 based on the transmitted adjustment information by using the moving unit (not shown).

According to the flowchart of FIG. 4, the user transmits information about a measured value of the distance Ls via the operation-input unit 2. However, the control unit 3 may measure the value of the distance Ls by using the above-described measuring unit (not shown) at a later step.

Subsequently, at step S2, the control unit 3 detects the distances Xu and Xl relating to the position of the opening of the X-ray diaphragm 9 adjusted at step S1. Then, the control unit 3 stores and sets the above-described detected information (the distances Xu and Xl) to the RAM 7, for example.

Subsequently, at step S3, the position-information-calculation unit 32 of the control unit 3 calculates the irradiation-area-position information relating to the position of the irradiation area that is irradiated with the X ray 1a restricted by the X-ray diaphragm 9, the position being defined on the sensor 4, based on diaphragm-position information relating to the position of the X-ray diaphragm 9.

More specifically, in FIG. 2, the position-information-calculation unit 32 calculates the distance Yu between the center position P12 of the sensor 4 and the irradiation-area-upper-end position Pu and the distance Yl between the center position P12 and the irradiation-area-lower-end position Pl, as the irradiation-area-position information. At that time, the position-information-calculation unit 32 calculates the distances Yu and Yl according to Equations (1) and (2) based on the diaphragm-position information (the distances Xu and Xl that are detected at step S2, and the distance Lc on which data is transmitted at step S1) and the distance Ls on which data is transmitted at step S1. Then, the position-information-calculation unit 32 stores and sets the calculated irradiation-area-position information (the distances Yu and Yl) to the RAM 7, for example.

After that, the user transmits information about image-capturing conditions to the control unit 3 via the operation-input unit 2. Subsequently, at step S4, the control unit 3 detects the above-described transmission, and stores and sets the above-described various information transmitted via the operation-input unit 2 to the RAM 7, for example. At step S4, first, information about the X-ray-irradiation time Tx, the electrical-charge-reading time Tr, etc. is transmitted, as the image-capturing conditions, via the operation-input unit 2, and the above-described information is stored in the RAM 7. Then, the control unit 3 determines the range of times (frame times) Tf1 that can be input, where each of the times Tf1 indicates the intervals at which the X-ray image corresponding to a single frame is captured. If a value on which data is input via the operation-input unit 2 falls within the above-described range of the times Tf1 that can be input, the input value data is accepted. A method of determining the range of the frame times that can be input will be described, as below.

More specifically, the reading-start-time-determination unit 33 of the control unit 3 determines the range of the times (frame times) Tf1 that can be input, where each of the times Tf1 indicates the intervals at which the X-ray image corresponding to a single frame is captured based on the irradiation-area-position information calculated at step S3. Here, the position where the electrical-charge reading is started on the non-irradiation area of the sensor 4 corresponds to the upper-end position P11 and the lower-end position P13 that are shown in FIG. 3. Further, the position determined based on the irradiation-area-position information corresponds to the irradiation-area-upper-end position Pu and the irradiation-area-lower-end position Pl that are shown in FIG. 3.

More specifically, first, the reading-start-time-determination unit 33 calculates the electrical-charge-reading time Tu and the electrical-charge-reading time Tl according to Equations (3) and (4) based on the electrical-charge-reading time Tr and the distance Yh on which data is transmitted via the operation-input unit 2, and the distances Yu and Yl that are calculated at step S3. Next, the reading-start-time-determination unit 33 compares the electrical-charge-reading time Tu to the electrical-charge-reading time Tl and determines the time shorter than the other to be the minimum time. According to FIG. 5 which will be described later, the electrical-charge-reading time Tl is determined to be the minimum time.

After that, the reading-start-time-determination unit 33 compares the determined minimum time (the electrical-charge-reading time Tl) to transmitted data on the X-ray-irradiation time Tx and selects the time shorter than the other to be a selection time. Here, according to FIG. 5 which will be described later, the electrical-charge-reading time Tl is selected, as the selection time. In that case, according to the range of the frame times that can be input, the range being illustrated in FIG. 5 that will be described later, the relationship shown as (the irradiation time Tx+the time Tr where the electrical charges existing on all of the lines are read−Tl)×2≦the frame time Tf1≦(the irradiation time Tx+the time Tr where the electrical charges existing on all of the lines are read)×2 is established. Here, the time Tr where the electrical charges existing on all of the lines are read is unique to the sensor 4. Further, in the first embodiment, the time Tr where the electrical charges existing on all of the lines are read is closely analogous to the irradiation time Tx=the wait-for-the electrical-charge reading Tw. Then, when the value on which data is transmitted via the operation-input unit 2 falls within the above-described determined range where the frame-time data can be input, the control unit 3 accepts and stores the transmitted value data in the RAM 7.

Subsequently, at step S5, the reading-start-time-determination unit 33 determines the time where reading of electrical charges existing on the sensor 4 is started from the upper and lower ends of the sensor 4. More specifically, the electrical-charge-reading-start time is determined, as below. When an input value of the frame time is determined to be a value Tfx, the reading of the electrical charges is started after the time shown as ((the irradiation time Tx+the time Tr where the electrical charges existing on all of the lines are read)×2−Tfx)/2 elapses since the X-ray irradiation is started. At that time, the time where reading of electrical charges existing on at least part of the non-irradiation area (the area 4b shown in FIG. 3) of the sensor 4 is started falls within the time period where irradiation with the X ray 1a applied from the X-ray-generation unit 1 is performed. According to FIG. 5 which will be described later, the reading-start-time-determination unit 33 determines the time preceding the time where the irradiation with the X ray 1a applied from the X-ray-generation unit 1 is finished by as much as the above-described selection time to be the reading-start time. Then, the reading-start-time-determination unit 33 stores and sets information about the determined time where reading of the electrical charges existing on the sensor 4 is started to the RAM 7, for example.

Subsequently, at step S6, the control unit 3 determines whether or not the user operates the irradiation switch 2a so that the irradiation switch 2a is turned on. If a result of the above-described determination indicates that the irradiation switch 2a is not turned on, the control unit 3 waits at step S6 until it is determined that the irradiation switch 2a is turned on at step S3.

Figure 5:
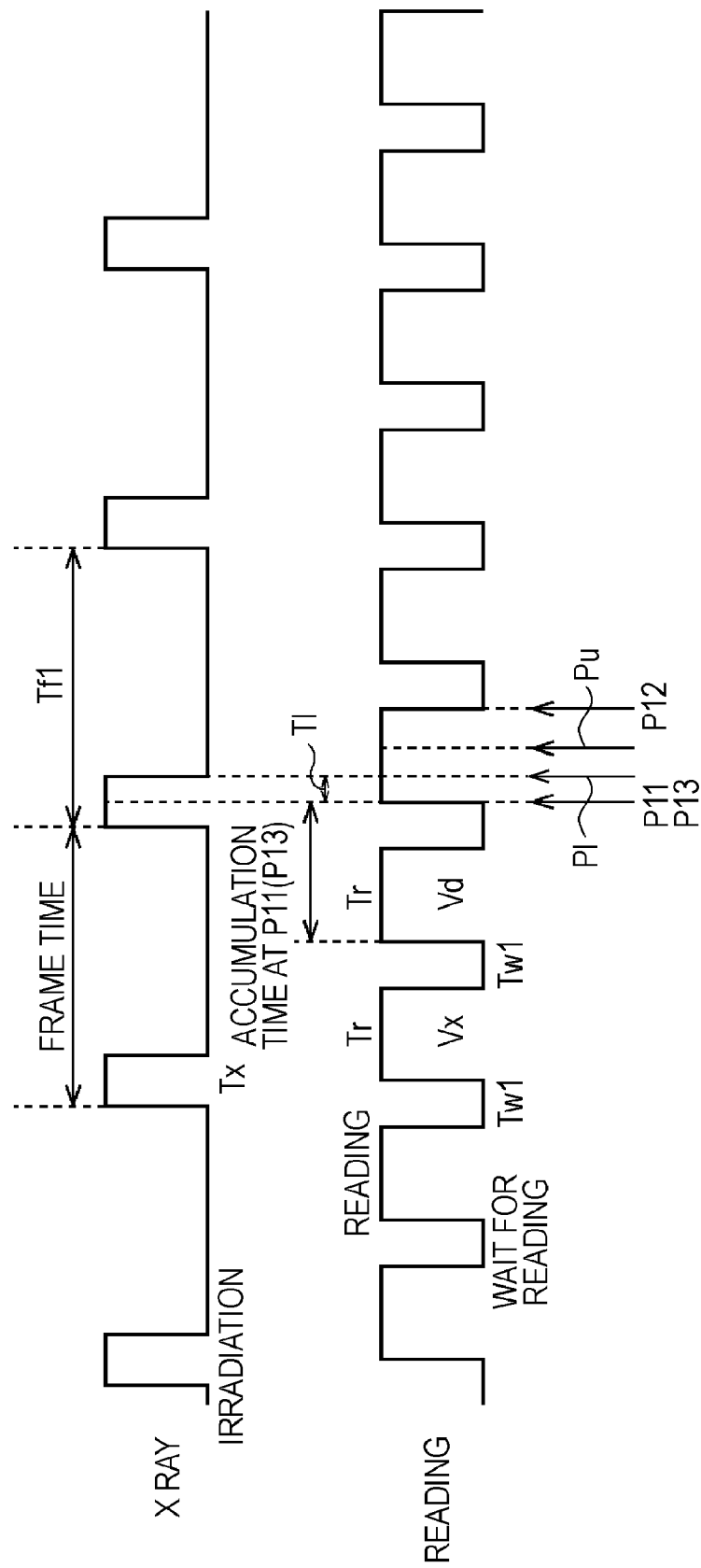
FIG. 5 is a timing chart that shows an example operation of the X-ray-image-capturing apparatus (the imaging-control apparatus) according to the first embodiment and that shows example time where X-ray irradiation is performed in video-capturing mode and example time where electrical charges of the sensor are read in the video-capturing mode.

FIG. 5 is a timing chart that shows an example operation of the X-ray-image-capturing apparatus (the imaging-control apparatus) 10 according to the first embodiment of the present invention and that shows example time where the X-ray irradiation is performed in the video-capturing mode and example time where the electrical charges existing on the sensor 4 are read in the video-capturing mode.

FIG. 5 shows the intervals (frame times) Tf1 at which the X-ray-image data corresponding to a single frame is captured, the electrical-charge-reading time Tr, and the X-ray-irradiation time Tx. Further, in FIG. 5, a pixel value relating to an X-ray image on which data is read after the X-ray irradiation is determined to be a pixel value Vx, a pixel value relating to a dark image on which data is read without performing the X-ray irradiation is determined to be a pixel value Vd, and the wait for the electrical-charge reading is determined to be a time Tw1.

Since the electrical-charge-reading time Tl is shorter than the X-ray-irradiation time Tx, as shown in FIG. 5, the reading-start-time-determination unit 33 selects the electrical-charge-reading time Tl, as the selection time. When the selection time is determined, the reading-start-time-determination unit 33 determines to start reading the electrical charges at the time preceding the time where the irradiation with the X ray 1a is finished by as much as at least the electrical-charge-reading time T1, as shown in FIG. 5. According to FIG. 5, the electrical-charge reading is started at the time preceding the time where the irradiation with the X ray 1a is finished by as much as the electrical-charge-reading time T1. Therefore, when the X-ray-image-capturing processing is performed at step S7 which will be described later, electrical charges of the conversion elements provided at the upper-end position P11 and the lower-end position P13 of the sensor 4 are read at the time where the electrical-charge reading is started, as shown in FIG. 5. Then, at the time where the irradiation with the X ray 1a is finished, the electrical charges of the conversion elements provided at the irradiation-area-lower-end position P1 are read. Then, after the irradiation with the X ray 1a is finished, the electrical charges of the conversion elements provided at the irradiation-area-upper-end position Pu and the center position P12 of the sensor 4 are read in sequence.

Returning to FIG. 4, when it is determined that the irradiation switch 2a is turned on at step S6, the processing advances to step S7. At step S7, the image-capturing unit 31 controls the sensor 4 based on the frame time determined at step S4, the time where the electrical charges of the sensor 4 are read, the time being determined at step S5, etc., and captures an X-ray image.

More specifically, the image-capturing unit 31 controls the time where the irradiation with the X ray 1a applied from the X-ray-generation unit 1 is performed based on the frame time Tf1 and the X-ray-irradiation time Tx. Then, the image-capturing unit 31 performs control over reading of electrical charges stored in the sensor 4 based on the electrical-charge-reading-start time determined at step S5, and captures the X-ray image. At that time, the image-capturing unit 31 sets the pixel value of an image generated based on the electrical charges existing on the non-irradiation area (the area 4b shown in FIG. 3) of the sensor 4 to a predetermined value, for example, 0. When the pixel value of the image generated on the non-irradiation area is set to 0 in the above-described manner, the non-irradiation area other than the irradiation area (the area 4a shown in FIG. 3) can be made invisible. Then, the image-capturing unit 31 accumulates and stores data on the above-described X-ray image in the accumulation unit 8, for example.

After that, the image-capturing unit 31 captures a dark image in the state where no irradiation with the X ray 1a applied from the X-ray-generation unit 1 is performed, as shown in FIG. 5. Then, the image-capturing unit 31 accumulates and stores data on the dark image in the accumulation unit 8, for example.

After that, the control unit 3 performs offset correction for an X-ray image by using the dark image. More specifically, when a pixel value relating to the X-ray image is determined to be a value Vx and a pixel value relating to the dark image is determined to be a value Vd, the control unit 3 performs the offset correction for the X-ray image by performing a calculation shown as Equation (5), as below.

$$Vo = Vx - Vd \qquad \text{Equation (5)}$$

A pixel value Vo of the X-ray image that had been subjected to the offset correction can be obtained through the calculation shown as Equation (5), and the control unit 3 performs the offset correction for each of pixels of the X-ray image. Then, the control unit 3 stores data on the X-ray image that had been subjected to the offset correction in the accumulation unit 8, for example. After that, the control unit 3 displays the X-ray image on the display unit 5, as required.

By performing the above-described processing procedures, capturing the X-ray-image data corresponding to a single frame is finished. By performing the above-described capturing processing plural times, the X-ray-image data corresponding to plural frames is captured.

Figure 11:
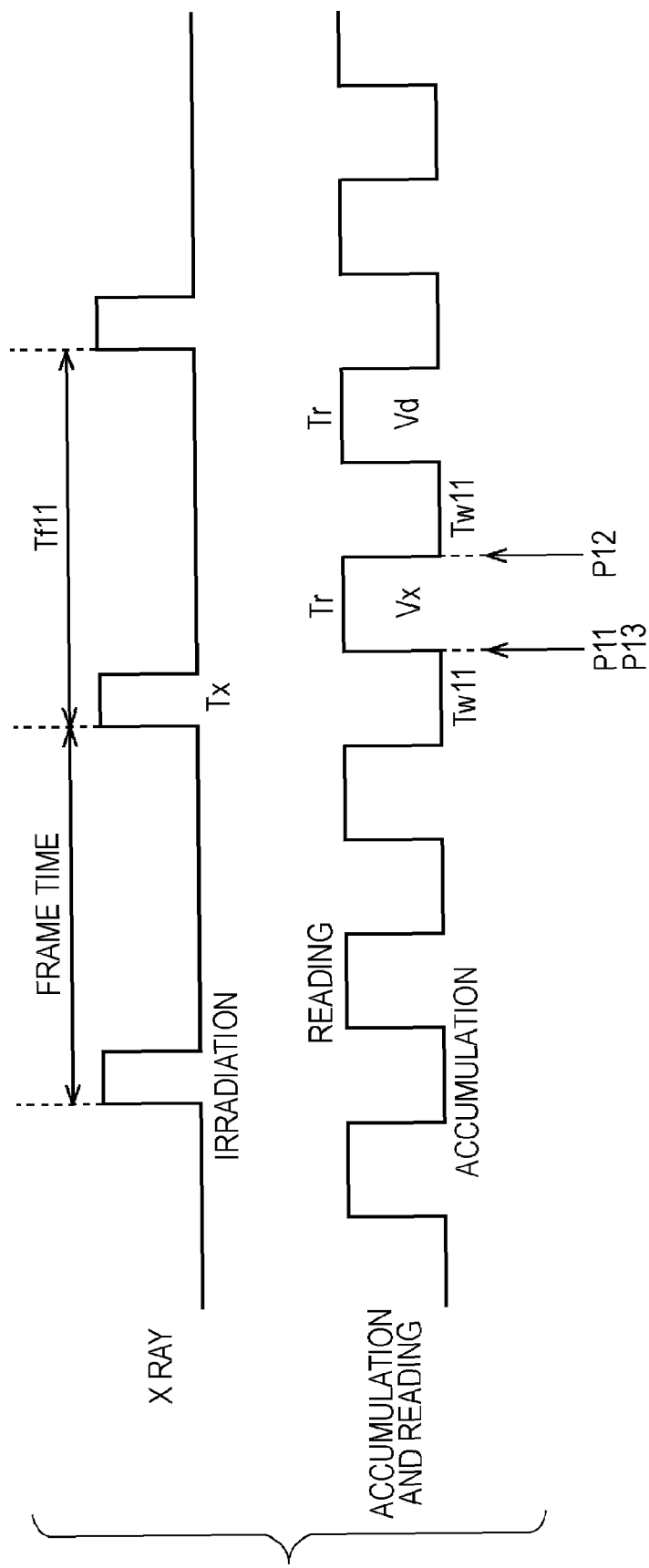
FIG. 11, which shows a known example, is a timing chart showing example time where X-ray irradiation is performed in video-capturing mode and example time where electrical charges are accumulated and/or read in and/or from photoelectric-conversion elements of a sensor in the video-capturing mode.

According to the X-ray-image-capturing apparatus 10 of the first embodiment, when the irradiation area irradiated with X ray 1a is restricted by the X-ray diaphragm 9, reading of electrical charges existing on the non-irradiation area 4b is started during the irradiation with the X ray 1a. Therefore, an electrical-charge-accumulation time Tw11 shown in FIG. 11 can be reduced, for example. Namely, according to the first embodiment, when the visual field is small due to the restricted irradiation area, high-speed imaging can be achieved solely by moving forward the time where the electrical charges are read. On the other hand, when the visual field is large due to the non-restricted irradiation area, low-speed imaging can be achieved since the electrical-charge reading is performed after the irradiation with the X ray 1a is finished.

Thus, according to the X-ray-image-capturing apparatus 10 of the first embodiment, it becomes possible to achieve high-speed imaging with a small visual field and a low-speed imaging with a large visual field by using a simple configuration without complicating the configuration of the X-ray-image-capturing apparatus 10.

According to the first embodiment, the X-ray diaphragm 9 is moved and adjusted by the control unit 3. However, the X-ray diaphragm 9 may be manually moved and adjusted by the user. In that case, at step S4, the control unit 3 detects the distances Xu and Xl relating to the position of the opening of the X-ray diaphragm 9 based on the X-ray diaphragm 9 which is manually moved and adjusted by the user.

Further, according to the first embodiment, the opening of the X-ray diaphragm 9 has a rectangular shape. However, the opening of the X-ray diaphragm 9 may have a circular shape and/or a polygonal shape. Further, even though the distance Ls between the focus position O of the X-ray-generation unit 1 and the sensor 4 varies in the first embodiment, a so-called C-arm type X-ray-image-capturing apparatus may be used, for example, so that the distance Ls does not vary. Since the value of the distance Ls is fixed in that case, the distance Ls need not be measured.

Still further, according to the first embodiment, the electrical-charge reading is performed from each of the upper-end position P11 and the lower-end position P13 of the sensor 4 toward the center position P12 of the sensor 4 at one time. However, without being limited to the above-described embodiment, the electrical-charge reading may be performed from the upper-end position 11 toward the lower-end position P13, which constitutes another embodiment of the present invention. In the above-described embodiment, the position-information-calculation unit 32 calculates the distance Yu according to Equation (1) and the reading-start-time-determination unit 33 calculates the electrical-charge-reading time Tu according to Equation (3). Further, in the above-described embodiment, the reading-start-time-determination unit 33 determines the electrical-charge-reading time Tu to be the minimum time.

Further, according to the first embodiment, the electrical-charge-reading time Tl is shorter than the X-ray-irradiation time Tx. However, the X-ray-irradiation time Tx may be shorter than the electrical-charge-reading time Tl. In that case, the reading-start-time-determination unit 33 selects the X-ray-irradiation time Tx, as the selection time.

Further, according to the first embodiment, each of the image-capturing unit 31, the position-information-calculation unit 32, and the reading-start-time-determination unit 33 is achieved through software by the control unit 3 executing the program stored in the ROM 6. However, as an alternative each of the units 31 to 33 may be achieved using hardware.

Further, according to the first embodiment, electrical charges obtained in the time period where the X-ray irradiation is performed are read, and electrical charges obtained in the time period where no X-ray irradiation is performed are read, as shown in FIG. 5. However, the above-described order in which the electrical charges are read may be reversed. For example, the electrical charges obtained in the time period where the X-ray irradiation is performed may be read after the electrical charges obtained in the time period where no X-ray irradiation is performed are read.

Second Embodiment

A second embodiment of the present invention will now be described with reference to the attached drawings.

The schematic configuration of an X-ray-image-capturing apparatus (imaging-control apparatus) according to the second embodiment is the same as that of the X-ray-image-capturing apparatus 10 according to the first embodiment shown in FIG. 1. However, the main difference between the first and second embodiments is the difference between the processing procedures performed by the position-information-calculation units 32 of the first and second embodiments, where each of the position-information-calculation units 32 calculates the irradiation-area-position information relating to the position of the irradiation area restricted by the X-ray diaphragm 9, the position being defined on the sensor 4.

Figure 6:
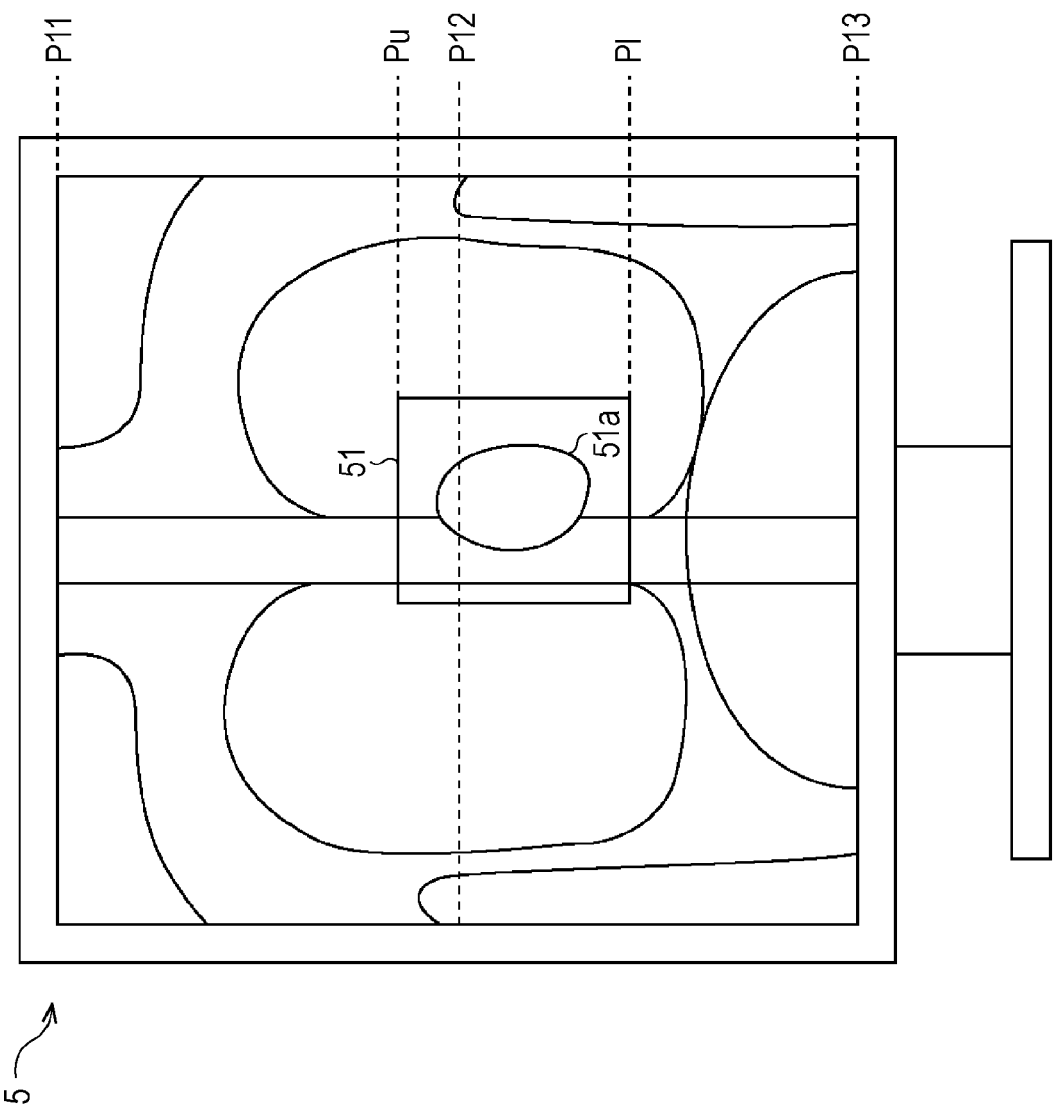
FIG. 6 is a schematic diagram illustrating processing procedures performed by a position-information-calculation unit of an X-ray-image-capturing apparatus according to a second embodiment of the present invention.

FIG. 6 is a schematic diagram illustrating the processing procedures performed by the position-information-calculation unit 32 of the X-ray-image-capturing apparatus according to the second embodiment of the present invention.

On the display unit 5 shown in FIG. 6, an X-ray image generated based on an X ray 1a that passed through the subject (examinee) 20 (more specifically, an X-ray-chest image of the subject 20) is displayed. Namely, in the second embodiment, an X-ray image of the subject (examinee) 20 is captured in advance and the display unit 5 is made to display the X-ray image. In that case, the X-ray diaphragm 9 is fully opened and an X-ray image extending over a wide range (the large view field) is displayed.

Further, in the following description, a single conversion element of the sensor 4 corresponds to a single pixel of the display unit 5 (that is, a single pixel of the X-ray image) for the sake of simplicity. Namely, an X-ray image generated based on electrical charges read from conversion elements provided on the entire area of the sensor 4 is displayed over the entire display screen of the display unit 5. More specifically, as shown in FIG. 6, the position of the upper end of the display screen of the display unit 5 corresponds to the upper-end position P11 of the sensor 4 shown in FIG. 3, and the position of the lower end of the display screen of the display unit 5 corresponds to the lower-end position P13 of the sensor 4 shown in FIG. 3. Further, as shown in FIG. 6, the position of the center part of the display screen of the display unit 5 corresponds to the center position P12 of the sensor 4 shown in FIG. 3.

When the user specifies an image area 51 through which the user wishes to capture an X-ray image with a high-speed frame rate by using the operation-input unit 2 while viewing the X-ray image displayed on the display unit 5, the control unit 3 (the position-information-calculation unit 32) detects the specified image area 51. In that case, the operation-input unit 2 serves as an input unit configured to specify the image area 51 corresponding to the area irradiated with X rays, the irradiation area being defined on the sensor 4. According to the embodiment shown in FIG. 6, an image area showing the image of a heart 51a of the subject (examinee) 20 is specified by the user, as the image area 51 corresponding to the X-ray-irradiation area of the sensor 4.

According to the second embodiment, a single conversion element of the sensor 4 corresponds to a single pixel of the display unit 5. Therefore, the position of the image area 51 corresponds to that of the sensor 4. More specifically, as shown in FIG. 6, the position of the upper end of the image area 51 corresponds to the irradiation-area-upper-end position Pu shown in FIG. 3 and the position of the lower end of the image area 51 corresponds to the irradiation-area-lower-end position Pl shown in FIG. 3. When the image area 51 is specified, the position-information-calculation unit 32 of the control unit 3 calculates the irradiation-area-position information (the distances Yu and Yl that are shown in FIG. 3) relating to the position of the area irradiated with the X ray 1a, the position being defined on the sensor 4.

After that, as is the case with the first embodiment, the reading-start-time-determination unit 33 calculates the time Tu where electrical charges are read from the upper-end position P11 of the sensor 4 to the irradiation-area-upper-end position Pu corresponding to the position of the upper end of the image area 51 according to Equation (3). Similarly, the reading-start-time-determination unit 33 calculates the time Tl where electrical charges are read from the lower-end position P13 of the sensor 4 to the irradiation-area-lower-end position Pl corresponding to the position of the lower end of the image area 51 according to Equation (4).

Next, the reading-start-time-determination unit 33 compares the electrical-charge-reading time Tu to the electrical-charge-reading time Tl and determines the time shorter than the other to be the minimum time, as is the case with the first embodiment. In the second embodiment, the electrical-charge-reading time T1 is also shorter than the electrical-charge-reading time Tu, as shown in FIG. 6. Therefore, the reading-start-time-determination unit 33 determines the electrical-charge-reading time T1 to be the minimum time.

After that, the reading-start-time-determination unit 33 compares the X-ray-irradiation time Tx to the minimum time Tl and selects the time shorter than the other, as the selection time.

Figure 7:
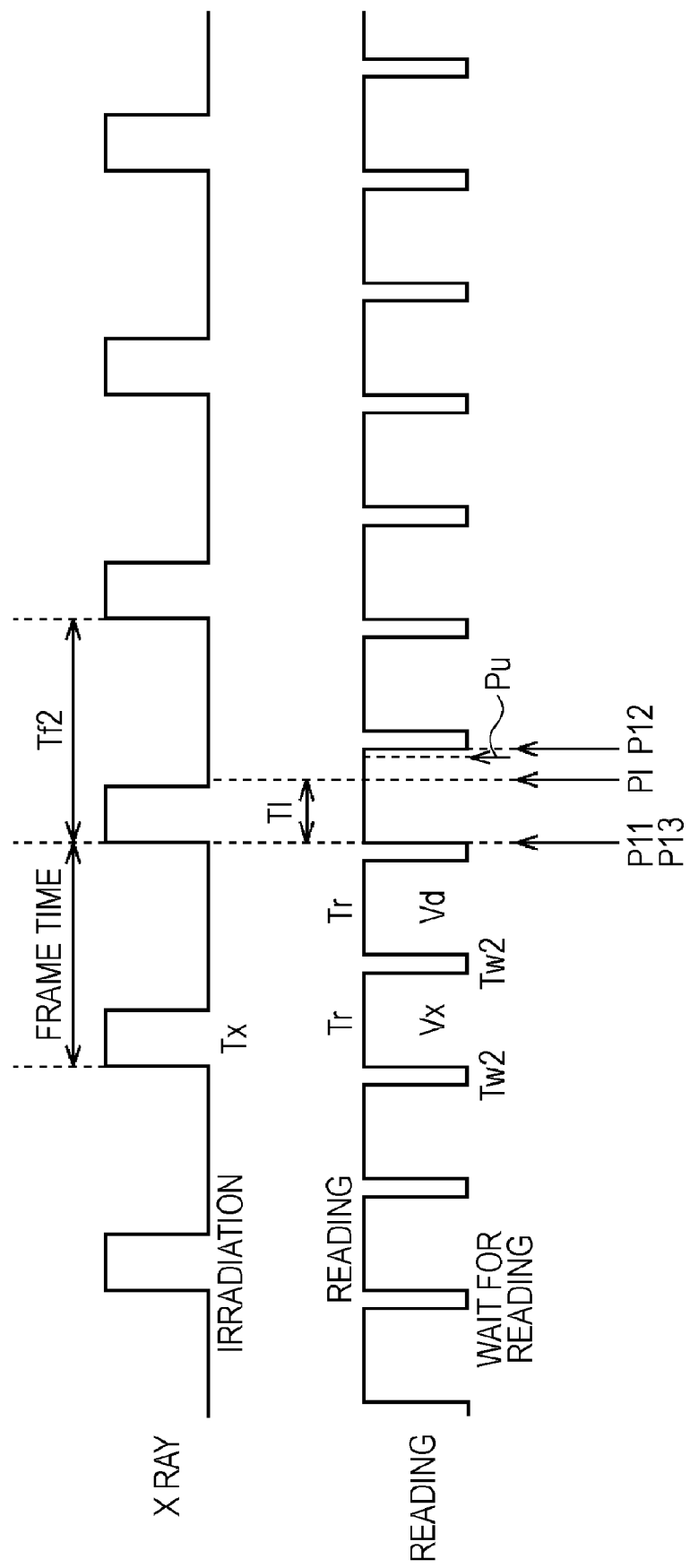
FIG. 7 is a timing chart that shows an example operation of the X-ray-image-capturing apparatus (the imaging-control apparatus) according to the second embodiment and that shows example time where X-ray irradiation is performed in video-capturing mode and example time where electrical charges of a sensor are read in the video-capturing mode.

FIG. 7 is a timing chart that shows an example operation of the X-ray-image-capturing apparatus (the imaging-control apparatus) according to the second embodiment of the present invention and that shows example time where the X-ray irradiation is performed in the video-capturing mode and example time where the electrical charges of the sensor 4 are read in the video-capturing mode. Here, FIG. 7 shows that the X-ray-irradiation time Tx is shorter than the minimum time Tl. Further, FIG. 7 does not show time relating to capturing an X-ray image that should be displayed on the display unit 5 in advance.

Further, in FIG. 7, a time required to capture the X-ray image corresponding to a single frame (frame time) is determined to be the time Tf2, the X-ray-irradiation time is determined to be the time Tx, and the electrical-charge-reading time is determined to be the time Tr. Further, in FIG. 7, a pixel value relating to an X-ray image on which data is read after the X-ray irradiation is performed is determined to be the pixel value Vx, a pixel value relating to a dark image on which data is read without performing the X-ray irradiation is determined to be the pixel value Vd, and the wait for the electrical-charge reading is determined to be a time Tw2.

According to the embodiment shown in FIG. 7, the reading-start-time-determination unit 33 selects the X-ray-irradiation time Tx, as the selection time. When the selection time is determined, the reading-start-time-determination unit 33 determines to start reading the electrical charges at the time preceding the time where the irradiation with the X ray 1a is finished by as much as the X-ray-irradiation time Tx. Namely, the reading-start-time-determination unit 33 determines to start reading the electrical charges at the same time as when the irradiation with the X ray 1a is started. Therefore, as shown in FIG. 7, the electrical charges of the conversion elements provided at the upper-end position P11 of the sensor 4 and the conversion elements provided at the lower-end position P13 of the sensor 4 are read at the same time as when the irradiation with the X ray 1a is started. Then, after the irradiation with the X ray 1a is finished, the electrical charges of the conversion elements provided at the irradiation-area-lower-end position P1, the electrical charges of the conversion elements provided at the irradiation-area-upper-end position Pu, and the electrical charges of the conversion elements provided at the center position P12 of the sensor 4 are read in sequence.

Next, example processing procedures performed by the X-ray-image-capturing apparatus (the imaging-control apparatus) 10 according to the second embodiment will be described with reference to a flowchart of FIG. 8. In FIG. 8, the same processing steps as those shown in FIG. 4 are designated by the same reference numerals and the description thereof is omitted.

Figure 8:
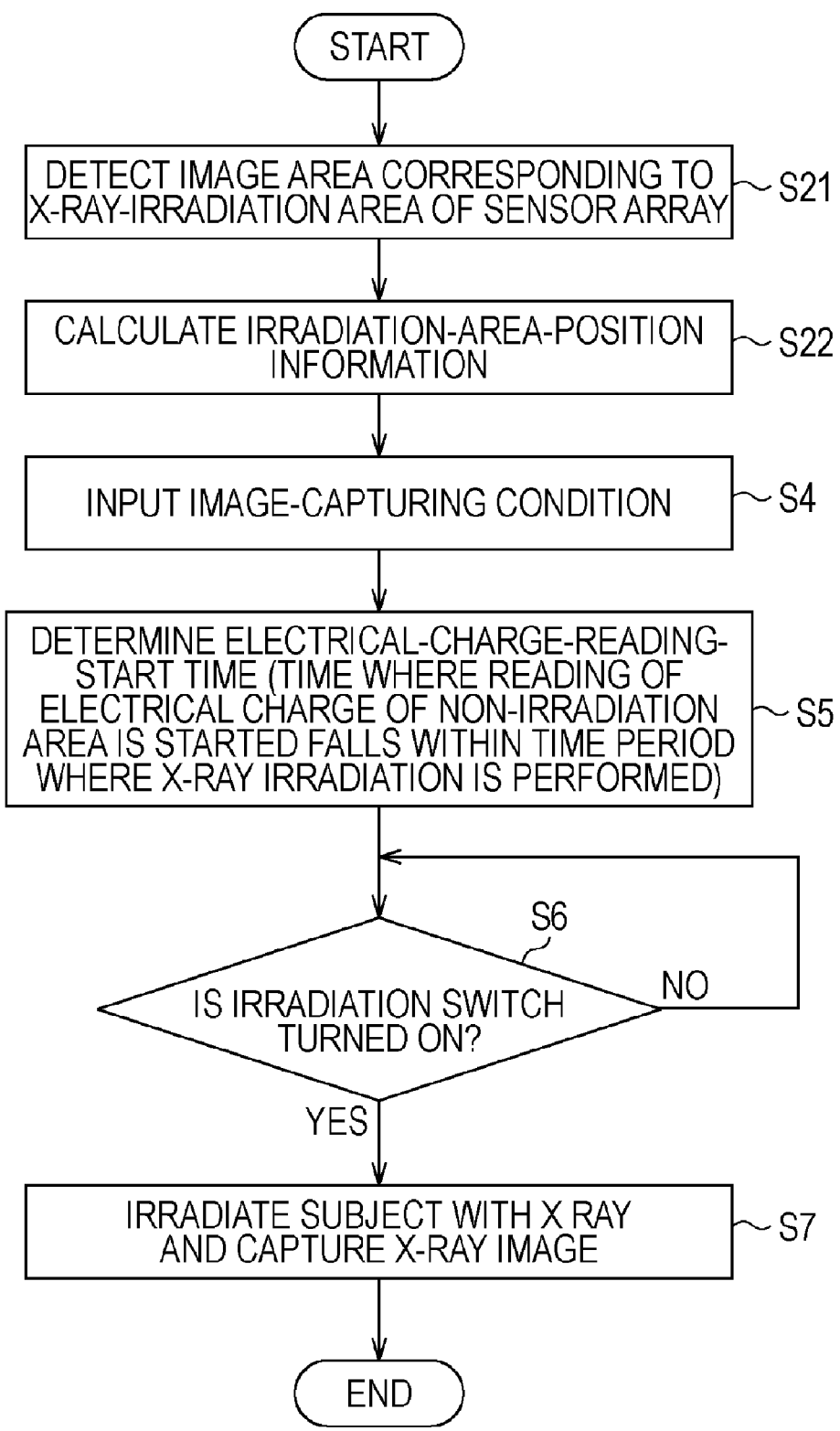
FIG. 8 is a flowchart showing processing procedures performed by the X-ray-image-capturing apparatus (the imaging-control apparatus) according to the second embodiment.

At step S21 shown in FIG. 8, first, when the irradiation switch 2a is turned on, the image-capturing unit 31 irradiates the subject (examinee) 20 with X rays 1a from the X-ray-generation unit 1 and captures an X-ray image, and the control unit 3 displays the X-ray image on the display unit 5. In that case, after the X-ray image is captured, the image-capturing unit 31 may further capture a dark image, and the control unit 3 may perform the offset correction for the X-ray image by using the dark image and display the X-ray image subjected to the offset correction on the display unit 5. After that, when the user specifies an image area on which the user wishes to capture an X-ray image with a high-speed frame rate, that is, the image-area 51 corresponding to the X-ray-irradiation area of the sensor 4 through the operation-input unit 2 while viewing the X-ray image displayed on the display unit 5, the control unit 3 (the position-information-calculation unit 32) detects the specified image area 51. Then, the control unit 3 (the position-information-calculation unit 32) stores and sets information relating to the detected image area 51 ton the RAM 7, for example.

Subsequently, at step S22, the position-information-calculation unit 32 of the control unit 3 calculates the irradiationarea-position information relating to the position of the area irradiated with the X ray 1a restricted by the X-ray diaphragm 9 based on the information relating to the image area 51 detected at step S21, the position being defined on the sensor 4.

More specifically, in the second embodiment, the position-information-calculation unit 32 calculates the irradiation-area-position information relating to the position of the area irradiated with the X rays 1a, the position being defined on the sensor 4 (the distances Yu and Yl shown in FIG. 3) based on the coordinates of the image area 51. Namely, the position-information-calculation unit 32 calculates the irradiation-area-position information by converting the image area 51 into an area that is defined on the sensor 4 and that corresponds to the image area 51. Then, the position-information-calculation unit 32 stores and sets the calculated irradiation-area-position information (the distances Yu and Yl) to the RAM 7, for example.

After that, the processing procedures corresponding to steps S4, S5, S6, and S7 shown in FIG. 4 are performed. Since the processing procedures performed at step S4 or later are the same as those performed in the first embodiment, the description thereof is omitted.

By performing the above-described processing procedures, capturing the X-ray-image data corresponding to a single frame is finished. By performing the above-described capturing processing plural times, the X-ray-image data corresponding to plural frames is captured.

According to the X-ray-image-capturing apparatus 10 of the second embodiment, when the image area 51 is specified from the X-ray image displayed on the display unit 5, reading of electrical charges of an image shown in an area other than the image area 51 is started during the irradiation with the X ray 1a. Therefore, for example, an electrical-charge-accumulation time Tw11 shown in FIG. 11 can be reduced. Namely, according to the second embodiment, when the visual field becomes small due to the specified image area 51, the high-speed imaging can be achieved solely by moving forward the time where the electrical charges are read. When the visual field becomes large because the image area 51 is not specified, the electrical-charge reading is performed after the irradiation with the X ray 1a is finished. Therefore, the low-speed imaging can be achieved.

Third Embodiment

Hereinafter, a third embodiment of the present invention will be described with reference to the attached drawings.

The schematic configuration of an X-ray-image-capturing apparatus (imaging-control apparatus) according to the third embodiment is the same as that of the X-ray-image-capturing apparatus 10 according to the first embodiment shown in FIG. 1. However, the main difference between the first and third embodiments is the difference between the processing procedures performed by the position-information-calculation units 32 of the first and third embodiments, where each of the position-information-calculation units 32 calculates the irradiation-area-position information relating to the position of the irradiation area that is restricted by the X-ray diaphragm 9, the position being defined on the sensor 4.

The position-information-calculation unit 32 of the first embodiment calculates the irradiation-area-position information based on information about the diaphragm position of the X-ray diaphragm 9 according to Equations (1) and (2). On the other hand, the position-information-calculation unit 32 of the third embodiment analyzes an X-ray image that had already been captured and automatically calculates the area irradiated with the X ray 1a. Namely, the position-information-calculation unit 32 of the third embodiment identifies the area of the X-ray image that had already been captured, the image area corresponding to the irradiation area defined on the sensor 4, and calculates the irradiation-area-position information based on the result of the above-described identification. Therefore, in the third embodiment, it is difficult to acquire the irradiation-area-position information relating to the X-ray-irradiation area restricted on the sensor 4 before an X-ray image is actually captured by performing the irradiation with the X rays 1a. Here, a method for automatically calculating the X-ray-irradiation area is disclosed in Japanese Patent Laid-Open No. 2000-70243, which was described above, for example.

Figure 9:
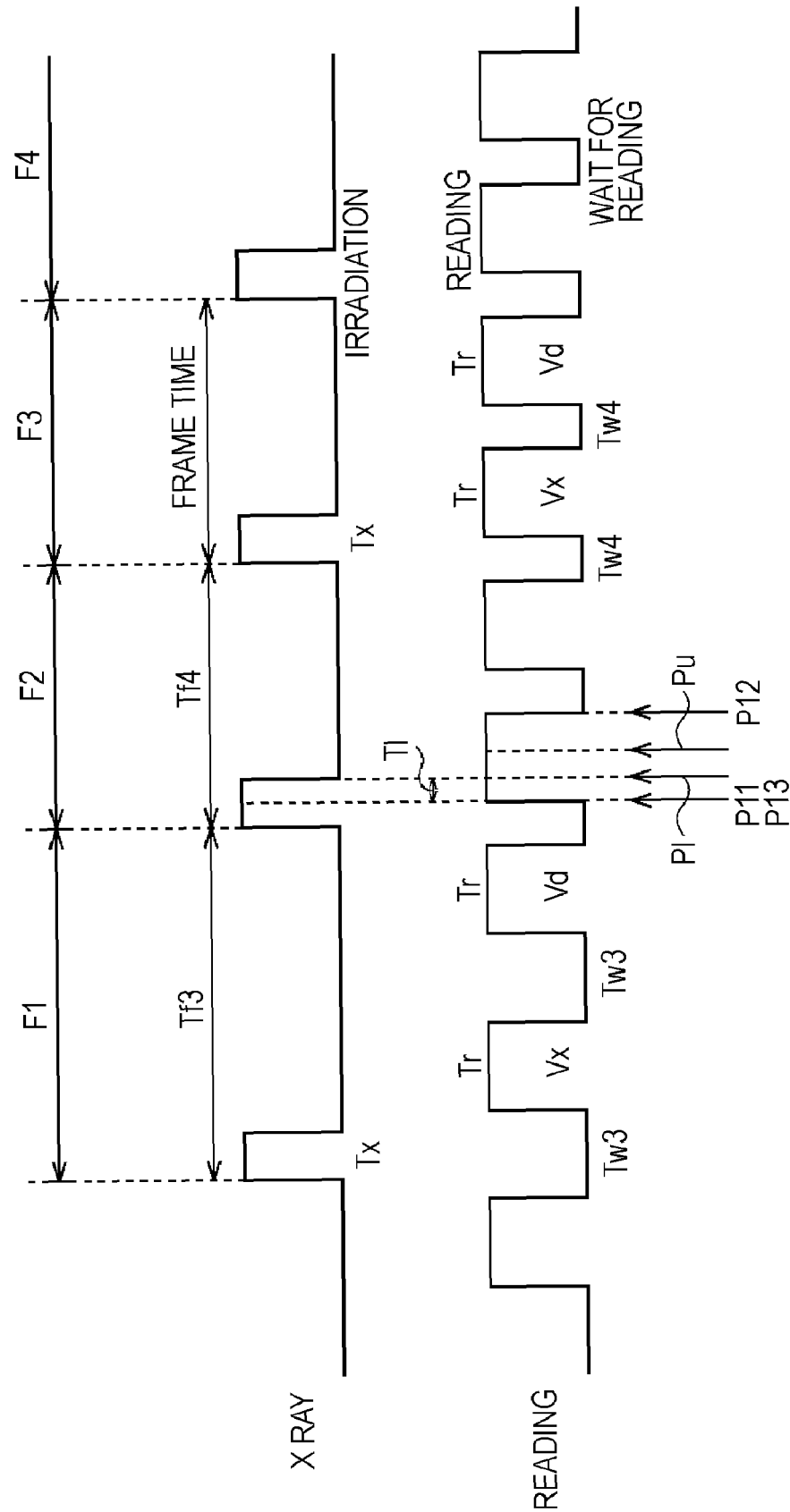
FIG. 9 is a timing chart that shows an example operation of an X-ray-image-capturing apparatus (the imaging-control apparatus) according to a third embodiment of the present invention and that shows example time where X-ray irradiation is performed in video-capturing mode and example time where electrical charges of a sensor are read in the video-capturing mode.

FIG. 9 is a timing chart that shows an example operation of the X-ray-image-capturing apparatus (the imaging-control apparatus) 10 according to the third embodiment of the present invention, and that shows example timing where the X-ray irradiation is performed in the video-capturing mode and example timing where the electrical charges existing on the sensor 4 are read in the video-image-capturing mode. Further, in FIG. 9, time relating to capturing an X-ray image is shown in the first frame (F1), the time being determined to identify the image area through the position-information-calculation unit 32.

In FIG. 9, reference numeral F1 designates the first frame obtained through the first image capturing, reference numeral F2 designates the second frame obtained through the second image capturing, reference numeral F3 designates the third frame obtained through the third image capturing, and reference numeral F4 designates the fourth frame obtained through the fourth image capturing. Further, in FIG. 9, the X-ray-irradiation time is designated by reference characters Tx, the frame time of the first frame F is designated by reference numeral Tf3, the frame time of the second frame F2 or later is designated by reference numeral Tf4, and the electrical-charge-reading time is designated by reference characters Tr. Further, a pixel value relating to an X-ray image on which data is read when the X-ray irradiation is performed is determined to be the pixel value Vx, a pixel value relating to a dark image on which data is read when the X-ray irradiation is not performed is determined to be the pixel value Vd, a time where the electrical charges of the first frame F1 are accumulated is determined to be a time Tw3, and the wait for the electrical-charge reading performed for the second frame F2 or later is determined to be a time Tw4.

First, when capturing an X-ray image in the first frame F1, the irradiation-area-position information about an area irradiated with the X ray 1a, the irradiation area being defined on the sensor 4, is not obtained. Therefore, the electrical-charge reading is not performed during the irradiation with the X ray 1a. When performing processing for the first frame F1, the image-capturing unit 31 performs the electrical-charge reading (Vx) after the X-ray irradiation is finished. In that case, the time required to accumulate electrical charges during the X-ray irradiation is the time Tw3.

After that, the image-capturing unit 31 captures a dark image by accumulating and reading electrical charges in the state where no X-ray irradiation is performed (Vd), so as to perform the offset correction. Then, the control unit 3 performs a calculation according to Equation (5) and performs the offset correction for the X-ray image. The position-information-calculation unit 32 analyzes the above-described X-ray image by using the method disclosed in Japanese Patent Laid-Open No. 2000-70243, for example, and performs identification, so as to automatically calculates the image area corresponding to the irradiation area defined on the sensor 4. Then, the position-information-calculation unit 32 calculates the irradiation-area-position information based on the identification result. After that, the reading-start-time-determination unit 33 performs the same processing procedures as those performed in the first embodiment.

In FIG. 9, the reading-start-time-determination unit 33 had determined the electrical-charge-reading time Tl to be the selection time for the second frame F2 or later. Therefore, the control unit 3 starts reading electrical charges at the time preceding the time where the irradiation with the X ray 1a is finished by as much as at least the selection time. In FIG. 9, the electrical-charge reading is performed at the time preceding the time where the irradiation with the X ray 1a is finished by as much as the selection time Tl.

Consequently, at the time where the electrical-charge reading is started, the electrical charges of the conversion elements provided at the upper-end position P11 and the lower-end position P13 of the sensor 4 are read, as shown in FIG. 9. When irradiation with the X rays 1a is finished, the electrical charges of the conversion elements provided at the irradiation-area-lower-end position P1 calculated as a result of the identification are read. Then, after the irradiation with the X rays 1a is finished, the electrical charges of the conversion elements provided at the irradiation-area-upper-end position Pu and the center position P12 of the sensor 4 that are calculated as results of the identification are read in sequence. Further, the time required to accumulate the electrical charges for the second frame F2 or later can be made shorter than the time Tw3 required to accumulate the electrical charges for the first frame F1.

Next, processing procedures performed by the X-ray-image-capturing apparatus 10 according to the third embodiment will be described. Here, the processing procedures performed by the X-ray-image-capturing apparatus 10 according to the second embodiment are the same as those shown in FIG. 8. Hereinafter, key features of the third embodiment will be described.

First, at step S21 shown in FIG. 8, when the irradiation switch 2a is turned on, the image-capturing unit 31 captures the X-ray image corresponding to the first frame F1. More specifically, the image-capturing unit 31 captures the X-ray image by irradiating the subject (examinee) 20 with the X rays 1a from the X-ray-generation unit 1 and further captures a dark image. Then, the control unit 3 performs the offset correction for the X-ray image by performing the calculation according to Equation (5). Then, the position-information-calculation unit 32 analyzes the X-ray image by using the method disclosed in Japanese Patent Laid-Open No. 2000-70243, for example, and performs identification, so as to automatically detect the image area corresponding to the irradiation area defined on the sensor 4. Then, the position-information-calculation unit 32 stores and sets information about the detected image area to the RAM 7, for example.

Subsequently, at step S22, the position-information-calculation unit 32 of the control unit 3 calculates the irradiation-area-position information relating to the position of the area irradiated with the X ray 1a restricted by the X-ray diaphragm 9, the position being defined on the sensor 4, based on information relating to the image area detected through the image identification performed at step S21.

More specifically, in the third embodiment, the position-information-calculation unit 32 calculates the irradiation-area-position information relating to the position of the area irradiated with the X rays 1a, the position being defined on the sensor 4 (the distances Yu and Yl shown in FIG. 3), based on the coordinates of the image area. That is to say, the position-information-calculation unit 32 calculates the irradiation-area-position information by converting the image area into the area corresponding to the image area, the corresponding area being defined on the sensor 4. Then, the position-information-calculation unit 32 stores and sets the calculated irradiation-area-position information (the distances Yu and Yl) to the RAM 7, for example.

After that, as is the case with the first embodiment, the processing procedures corresponding to steps S4, S5, S6, and S7 shown in FIG. 8 (FIG. 4) are performed. Here, at step S7 shown in FIG. 8, the image-capturing unit 31 captures an X-ray image by irradiating the subject (examinee) 20 with the X ray 1a applied from the X-ray-generation unit 1 and performing control on reading of the electrical charges detected on the sensor 4. In the third embodiment, the processing procedure performed at step S7 corresponds to capturing the X-ray images corresponding to the second frame F2 or later shown in FIG. 9.

More specifically, when capturing the X-ray image, the control unit 3 (the image-capturing unit 31) adjusts the X-ray diaphragm 9, which is the irradiation-area-restriction unit, based on the image area detect at step S21, and restricts the X rays 1a applied from the X-ray-generation unit 1. Then, the image-capturing unit 31 makes the X-ray-generation unit 1 apply the X rays 1a based on the time required to capture the X-ray image corresponding to a single frame (the frame time Tf4 in the third embodiment) and the X-ray-irradiation time Tx that are determined at step S4. Then, the image-capturing unit 31 captures the X-ray image by reading the electrical charge from the sensor 4 based on the electrical-charge-reading time Tr on which data is transmitted at step S4 and the electrical-charge-reading-start time determined at step S6. At that time, the image-capturing unit 31 sets the pixel value of the image generated based on electrical charges existing on the non-irradiation area (the area 4b shown in FIG. 3) defined on the sensor 4 to a predetermined value, for example, 0. By setting the pixel value of the image obtained on the non-irradiation area to zero in the above-described manner, the non-irradiation area other than the irradiation area (the area 4a shown in FIG. 3) can be made invisible. Then, the image-capturing unit 31 accumulates and stores data on the above-described X-ray image in the accumulation unit 8, for example.

After that, the image-capturing unit 31 captures a dark image in the state where no irradiation with the X rays 1a applied from the X-ray-generation unit 1 is performed, as shown in FIG. 9. Then, the image-capturing unit 31 accumulates and stores data on the dark image in the accumulation unit 8, for example. After that, as is the case with the first embodiment, the control unit 3 performs the offset correction for the X-ray image by using the dark image. Then, the control unit 3 stores data on the X-ray image subjected to the offset correction in the accumulation unit 8, for example. After that, the control unit 3 displays the X-ray image on the display unit 5, as required.

By performing the above-described processing procedures, capturing the X-ray image corresponding to the second frame F2 shown in FIG. 9 is finished. By performing the above-described capturing processing plural times, the X-ray images corresponding to plural frames, that is, the second frame F2 or later are captured.

According to the X-ray-image-capturing apparatus 10 of the third embodiment, the image area corresponding to the X-ray-irradiation area defined on the sensor 4 is detected by analyzing the X-ray image captured in the first frame F1. Subsequently, for the second frame F2 or later, reading of electrical charges of an image obtained in an area other than the above-described image area is started during the irradiation with the X ray 1a. Therefore, the time required to accumulate the electrical charges of the images corresponding to the second frame F2 or later can be reduced by as much as the time Tw3 required to accumulate the electrical charges of the first frame F1. That is to say, in the third embodiment, when identification of the X-ray image reveals that the visual field is so small that the above-described image area is provided in part of the X-ray image, the high-speed imaging can be achieved solely by moving forward the time where the electrical charges are read. On the other hand, when the identification of the X-ray image reveals that the visual field is so large that the entire X-ray image becomes the above-described image area, the electrical-charge reading is performed after the irradiation with the X rays 1a is finished, which makes it possible to perform the low-speed imaging.

In the third embodiment, the image area corresponding to the X-ray-irradiation area defined on the sensor 4 is detected by analyzing the X-ray image captured in the first frame F1. However, without being limited to the above-described embodiment, the X-ray image corresponding to any frame can be analyzed. Further, when capturing the X-ray image corresponding to the second frame F2 is finished and capturing the X-ray images corresponding to the third frame F3 or later is performed without moving the X-ray diaphragm 9, the area irradiated with the X ray 1a had already been obtained. In that case, therefore, the processing procedure performed at step S22 shown in FIG. 8 can be omitted.

According to the above-described first to third embodiments, the control unit 3 determines the range of times (frame times) that can be input, where each of the times indicates the intervals at which the X-ray image corresponding to a single frame is captured by referring to the irradiation-area-position information. However, the control unit 3 may uniquely set the image-capturing interval to the shortest frame. Further, although the control unit 3 and the sensor 4 are separated from each other according to the above-described first to third embodiments, the control unit 3 and the sensor 4 may be integrated with each other.

Each of components shown in FIG. 1, the components being included in the X-ray-image-capturing apparatus 10 according to the above-described first to third embodiments, and each of the steps shown in FIGS. 4 and 8 showing the methods of controlling the above-described X-ray-image-capturing apparatus 10 can be achieved by an operating program stored in the ROM 6. Each of the above-described program and a computer-readable storage medium storing the above-described program constitutes another embodiment of the present invention.

More specifically, the above-described program is presented to a computer by being stored in a storage medium such as a compact disk (CD)-read-only memory (ROM), or via various types of transfer mediums. The storage medium storing the above-described program may be, other than the CD-ROM, a flexible disk, a hard disk, a magnetic disk, a magneto-optical disk, a nonvolatile memory card, etc. On the other hand, the transfer medium of the program may be a communication medium used in the system of a computer network (a local-area network (LAN), a wide-area network (WAN) such as the Internet, a radio-communication network, etc.), the computer-network system being provided to propagate and supply program information as carrier waves. Further, the above-described communication medium may be a wired line such as an optical fiber, a wireless line, etc.

According to the present invention, functions of the X-ray-image-capturing apparatus 10 according to each of the above-described embodiments can be achieved not only by a computer executing a program supplied thereto. Namely, the functions of the X-ray-image-capturing apparatus 10 can also be achieved when the program is executed in concert with an operating system (OS), other application software, etc. running on the computer, so that the program constitutes another embodiment of the present invention. Further, the functions of the X-ray-image-capturing apparatus 10 according to each of the above-described embodiments can also be achieved when the entire and/or part of processing of the supplied program is executed by a function-expansion board and/or a function-expansion unit of the computer, so that the program constitutes another embodiment of the present invention.

An imaging-control apparatus (the X-ray-image-capturing apparatus 10) according to an embodiment of the present invention can achieve high-speed imaging with a small visual field and low-speed imaging with a large visual field by using a simple configuration that merely changes the time where electrical charges are read. Consequently, it is expected to make effective use of the imaging-control apparatus in the medical field where radiation-image (X-ray-image, etc.) capturing with speed higher than ever has been demanded.

While the present invention has been described with reference to the above-described embodiments, it is to be understood that the invention is not limited to the above-described embodiments. The scope of the following claims is to be accorded the broadest interpretation so as to encompass all modifications and equivalent structures and functions.

This application claims the benefit of Japanese Application No. 2007-179980 filed on Jul. 9, 2007, which is hereby incorporated by reference herein in its entirety.

What is claimed is:

1. A control apparatus for controlling a sensor which detects radiation from a radiation-generation device and generates an electrical charge based on the detected radiation, the control apparatus comprising:
    a determination unit configured to determine a time when at least one electrical charge of the sensor is read based on information about a position of an irradiation area of the sensor, the irradiation area being an area of the sensor irradiated with the radiation, so that a time period during which at least one electrical charge of a non-irradiation area of the sensor is read, the non-irradiation area being an area of the sensor not being irradiated with radiation, overlaps an irradiation time period during which irradiation of the irradiation area with the radiation is performed, and so that a time period where at least one electrical charge of the irradiation area of the sensor is read does not overlap the irradiation-time period; and
    a control unit configured to control reading of the electrical charge of the sensor based on the time at which the electrical charge of the sensor is read, the time being determined by the determination unit.

2. The control apparatus according to claim 1, further comprising an input unit configured to specify information about a position of an area corresponding to the irradiation area of the sensor.

3. The control apparatus according to claim 1, wherein the determination unit is configured to acquire the irradiation-area-position information based on a result of identification processing performed for a captured radiation image.

4. The control apparatus according to claim 1, wherein:
    the determination unit is configured to calculate a minimum time used to read the at least one electrical charge of the sensor from a position of the non-irradiation area, the position being a position where reading of the at least one electrical charge of the sensor is started, to the position of the irradiation area;

the determination unit is also configured to compare the minimum time to a time over which irradiation with the radiation applied from the radiation-generation device is performed and to select the shorter one of the minimum time and the irradiation time, as a selection time, and the determination unit is also configured to determine a time preceding the time where the irradiation with the radiation applied from the radiation-generation unit is finished by at time equal to or greater than the selection time to be time where the reading is started.

5. An image capture apparatus including a sensor adapted to detect incident radiation and generate an electric charge based on the detected radiation, and the control apparatus according to claim 1.

6. An image capture apparatus as claimed in claim 5 wherein the control apparatus is integrated with the sensor.

7. A control method for controlling a sensor which detects radiation from a radiation-generation unit and generates an electrical charge based on the detected radiation, the control method comprising:

determining a time when at least one electrical charge of the sensor is read based on information about a position of an irradiation area of the sensor, the irradiation area being an area of the sensor irradiated with the radiation, so that a time period during which at least one electrical charge of a non-irradiation area of the sensor is read, the non-irradiation area being an area of the sensor not being irradiated with radiation, overlaps an irradiation time period during which irradiation of the irradiation area with the radiation is performed, and so that a time period where at least one electrical charge of the irradiation area of the sensor is read does not overlap the irradiation-time period; and controlling reading of the electrical charge of the sensor based on the time at which the electrical charge of the sensor is read, the time being determined at the determination step.

8. The control method according to claim 7, wherein the determination step comprises:

calculating a minimum time used to read the at least one electrical charge of the sensor from a position of the non-irradiation area, the position being a position where reading of the at least one electrical charge of the sensor is started, to the position of the irradiation area;

comparing the minimum time to a time where irradiation with the radiation applied from the radiation-generation device is performed;

selecting the shorter one of the minimum time and the irradiation time, as a selection time, and determining a time preceding the time where the irradiation with the radiation applied from the radiation-generation unit is finished by a time equal to or greater than the selection time, as time where the reading is started.

9. A computer-readable storage medium storing a program making a computer execute a control method for controlling a sensor which detects a radiation from a radiation-generation unit and generates an electrical charge based on the detected radiation, the control method comprising:

determining a time when at least one electrical charge of the sensor is read based on information about a position of an irradiation area of the sensor, the irradiation area being an area of the sensor irradiated with the radiation, so that a time period during which at least one electrical charge of a non-irradiation area of the sensor is read, the non-irradiation area being an area of the sensor not being irradiated with radiation, overlaps a time period during which irradiation of the irradiated area with the radiation is performed, and a time period where at least one electrical charge of the irradiation area of the sensor is read does not overlap the irradiation-time period; and controlling reading of the electrical charge of the sensor based on the time at which the electrical charge of the sensor is read, the time being determined at the determination step.

10. The storage medium according to claim 9, wherein the determination step comprises:

calculating a minimum time used to read the at least one electrical charge of the sensor from a position of the non-irradiation area, the position being a position where reading of the at least one electrical charge of the sensor is started, to the position of the irradiation area;

comparing the minimum time to a time over which irradiation with the radiation applied from the radiation-generation device is performed;

selecting the shorter one of the minimum time and the irradiation time as a selection time, and determining a time preceding the time where the irradiation with the radiation applied from the radiation-generation unit is finished by a time equal to or greater than the selection time, as time where the reading is started.

* * * * *